United States Patent
Ibaraki

(10) Patent No.: US 9,823,389 B2
(45) Date of Patent: Nov. 21, 2017

(54) FILM, METHOD OF MANUFACTURING FILM, POLARIZING PLATE, LIQUID CRYSTAL DISPLAY DEVICE, AND COMPOSITION

(71) Applicant: FUJIFILM Corporation, Tokyo (JP)

(72) Inventor: Jyunko Ibaraki, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 114 days.

(21) Appl. No.: 14/886,658

(22) Filed: Oct. 19, 2015

(65) Prior Publication Data

US 2016/0109621 A1 Apr. 21, 2016

(30) Foreign Application Priority Data

Oct. 20, 2014 (JP) .................... 2014-213750

(51) Int. Cl.
| | |
|---|---|
| *C09K 19/00* | (2006.01) |
| *G02B 1/14* | (2015.01) |
| *G02B 1/04* | (2006.01) |
| *G02B 5/30* | (2006.01) |
| *G02F 1/13363* | (2006.01) |
| *B29L 11/00* | (2006.01) |

(52) U.S. Cl.
CPC ............... *G02B 1/14* (2015.01); *G02B 1/04* (2013.01); *G02B 5/3083* (2013.01); *G02F 1/13363* (2013.01); *B29L 2011/0066* (2013.01); *G02B 5/3033* (2013.01); *G02F 2001/133638* (2013.01); *Y10T 428/1036* (2015.01)

(58) Field of Classification Search
CPC . G02B 1/04; G02B 1/10; G02B 1/105; G02B 1/14; G02B 5/30; G02B 5/3083; G02B 5/32; G02F 1/13363; G02F 2001/133638; Y10T 428/105; Y10T 428/1077; Y10T 428/1082; Y10T 428/1059; C08J 5/18; C08L 1/08–1/14; C08K 5/46
USPC ......... 428/1.1, 1.3, 1.33, 1.54, 1.55; 349/96, 349/117, 118; 252/585; 106/170.1, 106/170.26, 170.27; 524/720
See application file for complete search history.

(56) References Cited

U.S. PATENT DOCUMENTS

| | | | |
|---|---|---|---|
| 8,623,472 B2 | 1/2014 | Sasada et al. | |
| 2010/0055354 A1 | 3/2010 | Sasada et al. | |
| 2011/0273646 A1* | 11/2011 | Fukagawa | C08J 5/18 349/96 |
| 2012/0088041 A1* | 4/2012 | Fukagawa | C09K 19/54 428/1.33 |
| 2014/0242302 A1* | 8/2014 | Nojiri | G02F 1/133528 428/1.55 |

FOREIGN PATENT DOCUMENTS

| | | |
|---|---|---|
| JP | 2010-79239 A | 4/2010 |
| JP | 2011-237580 A | 11/2011 |

* cited by examiner

*Primary Examiner* — Ruiyun Zhang
(74) *Attorney, Agent, or Firm* — Edwards Neils LLC; Jean C. Edwards, Esq.

(57) ABSTRACT

The object of the present invention is to provide a cellulose acylate-containing film capable of improving durability of polarizer, and of suppressing bleeding of an additive for improving the durability of the polarizer, a method of manufacturing the film, a polarizing plate, a liquid crystal display device and a composition. The present invention provides a film which includes a compound represented by Formula 1 defined by the specification, a compound represented by Formula 2 defined by the specification, and a cellulose acylate; wherein the content of each of the compounds represented by Formula 1 and Formula 2 in a zone ranging from one surface of the film to a depth of 10%, is higher than the content in the residual zone.

16 Claims, No Drawings

FILM, METHOD OF MANUFACTURING FILM, POLARIZING PLATE, LIQUID CRYSTAL DISPLAY DEVICE, AND COMPOSITION

CROSS-REFERENCE TO RELATED APPLICATIONS

The present application claims priority under 35 U.S.C. §119 to Japanese Patent Application No. 2014-213750 filed Oct. 20, 2014. The above application is hereby expressly incorporated by reference, in its entirety, into the present application.

TECHNICAL FIELD

This invention relates to a film, a method of manufacturing a film, a polarizing plate, a liquid crystal display device and a composition.

BACKGROUND ART

As liquid crystal display devices have increasingly been applied to television sets and the screen size has been expanding in recent years, there have been increasing needs for higher quality of image and lower cost. In addition, as liquid crystal display devices have increasingly been installed and used outdoors, the liquid crystal display devices have been required to be more durable under harsh environments.

As for polarizing plate in the liquid crystal display device, it is widely known to hold a polarizer, made of polyvinyl alcohol (PVA) and iodine, between polarizing plate protective films to thereby improve the durability. Various resin films, including cellulose acylate film and acrylic resin film, have been used for the polarizing plate protective film, for which toughness and good optical characteristics have been required.

Patent Literature 1 describes a cellulose acylate film with suitably controlled retardation and adhesiveness with the polarizer, showing in-plane orientation in a zone, which ranges from at least one surface of the film to a depth of 0 to 3 µm, lower than in-plane orientation in a 3 to 10 µm-deep zone.

Patent Literature 2 describes a polarizer which contains a polyvinyl alcohol-based resin, a dichroic dye, and 0.01 to 10 parts by mass, relative to the polyvinyl alcohol-based resin, of an organic acid having a specific structure. The polarizer is reportedly improved in durability of the polarizer under high-temperature and high-humidity conditions, and high-temperature and low-humidity conditions.

CITATION LIST

Patent Literatures

Patent Literature 1: JP-A-2010-79239
Patent Literature 2: JP-A-2011-237580

SUMMARY OF THE INVENTION

As described above, it has been required to further improve the durability of polarizer. Addition of a large amount of an additive for improving the durability of polarizer has, however, resulted in a problem of bleeding of the additive from the surface of the cellulose acylate film, in the process of saponification.

This invention was conceived in view of the situation described above, and is to provide a cellulose acylate-containing film capable of improving the durability of the polarizer, and of suppressing bleeding of the additive for improving the durability of the polarizer. This invention is to further provide a method of manufacturing the cellulose acylate-containing film, a polarizing plate, a liquid crystal display device, and a composition for manufacturing the film.

After extensive investigations aimed at solving the problems, the present inventors found that, in the film which includes a compound represented by Formula 1 below, a compound represented by Formula 2 below and a cellulose acylate, the above-described problems may be solved by elevating the individual contents of the compound represented by Formula 1 below and the compound represented by Formula 2 below, in a zone ranging from one surface of the film to a depth of 10%, above the individual contents in the residual zone. According to this invention, the inventions below will be provided.

(1) A film which comprises a compound represented by Formula 1 below, a compound represented by Formula 2 below, and a cellulose acylate, wherein
a content of the compound represented by Formula 1 below, in a zone ranging from one surface of the film to a depth of 10%, is higher than a content of the compound represented by Formula 1 below in a residual zone, and
a content of the compound represented by Formula 2 below, in a zone ranging from the one surface of the film to a depth of 10%, is higher than a content of the compound represented by Formula 2 below in a residual zone;

$$X\text{-}L\text{-}(R^1)_n \quad \text{Formula 1:}$$

in Formula 1, X represents an acidic group having an acid dissociation constant at 25° C. of 5.5 or less; L represents a single bond, or divalent or higher-valent linking group; $R^1$ represents an alkyl group having 6 to 30 carbon atoms, an alkenyl group having 6 to 30 carbon atoms, an alkynyl group having 6 to 30 carbon atoms, an aromatic hydrocarbon group having 6 to 30 carbon atoms or a heterocyclic group having 6 to 30 carbon atoms; n is 1 when L stands for a single bond, and is "valence of L−1" when L stands for a divalent or higher-valent linking group;

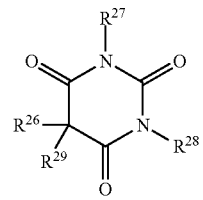

Formula 2 in Formula 2, $R^{26}$ represents an alkyl group, alkynyl group or aromatic hydrocarbon group; each of $R^{27}$ and $R^{28}$ independently represents a hydrogen atom, alkyl group, alkenyl group, aromatic hydrocarbon group or aromatic heterocyclic group; $R^{29}$ represents a hydrogen atom, alkyl group or aromatic hydrocarbon group; and each of $R^{26}$, $R^{27}$, $R^{28}$ and $R^{29}$ may independently have a substituent.

(2) The film of (1), wherein the compound represented by Formula 1 and the compound represented by Formula 2 are contained in a cellulose acylate (3) The film of (1), which further comprises a polymer composed of monomer having a molecular weight of 500 or less and showing an SP value difference of 2 or more away from the SP value of cellulose acylate.
(4) The film of (2), which further comprises a polymer composed of monomer having a molecular weight of 500 or less and showing an SP value difference of 2 or more away from the SP value of cellulose acylate.
(5) The film of (1), wherein, relative to a total content of the compound represented by Formula 1 contained in the film, a ratio of content of the compound represented by Formula 1 in a zone ranging from one surface of the film to a depth of 10% is 70% by mass or more, and a ratio of content of the compound represented by Formula 1 in a residual zone is 30% by mass or less; and, relative to a total content of the compound represented by Formula 2 contained in the film, a ratio of content of the compound represented by Formula 2 in a zone ranging from the one surface of the film to a depth of 10% is 70% by mass or more, and a ratio of content of the compound represented by Formula 2 in a residual zone is 30% by mass or less.
(6) The film of (2), wherein, relative to a total content of the compound represented by Formula 1 contained in the film, a ratio of content of the compound represented by Formula 1 in a zone ranging from one surface of the film to a depth of 10% is 70% by mass or more, and a ratio of content of the compound represented by Formula 1 in a residual zone is 30% by mass or less; and, relative to a total content of the compound represented by Formula 2 contained in the film, a ratio of content of the compound represented by Formula 2 in a zone ranging from the one surface of the film to a depth of 10% is 70% by mass or more, and a ratio of content of the compound represented by Formula 2 in a residual zone is 30% by mass or less.
(7) The film of (3), wherein, relative to a total content of the compound represented by Formula 1 contained in the film, a ratio of content of the compound represented by Formula 1 in a zone ranging from one surface of the film to a depth of 10% is 70% by mass or more, and a ratio of content of the compound represented by Formula 1 in a residual zone is 30% by mass or less; and, relative to a total content of the compound represented by Formula 2 contained in the film, a ratio of content of the compound represented by Formula 2 in a zone ranging from the one surface of the film to a depth of 10% is 70% by mass or more, and a ratio of content of the compound represented by Formula 2 in a residual zone is 30% by mass or less.
(8) The film of (1), which has a thickness of 0.1 to 120 µm.
(9) The film of (1), which is a retardation film.
(10) The film of (1), which is manufactured by coating a composition on one surface of a cellulose acylate film, the composition containing the compound represented by Formula 1, the compound represented by Formula 2, and a monomer having a molecular weight of 500 or less and showing an SP value difference of 2 or more away from the SP value of cellulose acylate; and allowing the monomer to polymerize.
(11) A method of manufacturing the film of (1), the method comprising:
coating a composition on one surface of a cellulose acylate film, the composition containing the compound represented by Formula 1, the compound represented by Formula 2, and a monomer having a molecular weight of 500 or less and showing an SP value difference of 2 or more away from the SP value of cellulose acylate; and
allowing the coated monomer to polymerize.
(12) A polarizing plate which comprises a polarizer and the film of (1).
(13) A liquid crystal display device which comprises the film of (1).
(14) A liquid crystal display device which comprises the polarizing plate of (12).
(15) A composition which comprises a compound represented by Formula 1 below, a compound represented by Formula 2 below, and a monomer having a molecular weight of 500 or less and showing an SP value difference of 2 or more away from the SP value of cellulose acylate;

$$X\text{-}L\text{-}(R^1)_n \qquad \text{Formula 1:}$$

in Formula 1, X represents an acidic group having an acid dissociation constant at 25° C. of 5.5 or less; L represents a single bond or divalent or higher-valent linking group; $R^1$ represents an alkyl group having 6 to 30 carbon atoms, an alkenyl group having 6 to 30 carbon atoms, an alkynyl group having 6 to 30 carbon atoms, an aromatic hydrocarbon group having 6 to 30 carbon atoms or a heterocyclic group having 6 to 30 carbon atoms; n is 1 when L stands for a single bond, and is "valence of L−1" when L stands for a divalent or higher-valent linking group;

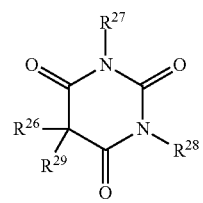

Formula 2 in Formula 2, $R^{26}$ represents an alkyl group, alkynyl group or aromatic hydrocarbon group; each of $R^{27}$ and $R^{28}$ independently represents a hydrogen atom, alkyl group, alkenyl group, aromatic hydrocarbon group or aromatic heterocyclic group; $R^{29}$ represents a hydrogen atom, alkyl group or aromatic hydrocarbon group; and each of $R^{26}$, $R^{27}$, $R^{28}$ and $R^{29}$ may independently have a substituent.

According to this invention, there is provided a cellulose acylate-containing film capable of improving the durability of the polarizer, and of suppressing bleeding of an additive for improving the durability of the polarizer. According to a composition of this invention and a method of manufacturing the film of this invention, it now becomes possible to manufacture the cellulose acylate-containing film of this invention. In a polarizing plate and a liquid crystal display device of this invention, the polarizer is improved in the durability, and the additive is suppressed from bleeding.

DESCRIPTION OF EMBODIMENTS

This invention will be detailed below. While the explanation on the constituent described below will occasionally be based on representative modes of embodiment of this invention, this invention is not limited to such modes of embodiment. In the context of this specification, all numerical ranges given in the form of "to" preceded and succeeded by numerals are defined to contain these numerals as the lower and upper limit values. Wordings of "normal" and "parallel" regarding angle are now interpreted to mean ranges given by (strict angle±10°). The solid content in the context of this specification means the one measured at 25° C.

<Film>

The film of this invention contains a compound represented by Formula 1 defined below, a compound represented by Formula 2 defined below, and a cellulose acylate, the content of the compound represented by Formula 1 below, in a zone ranging from one surface of the film to a depth of 10%, being higher than the content of the compound represented by Formula 1 below in the residual zone, and the content of the compound represented by Formula 2 below, in the zone ranging from the one surface of the film to a depth of 10%, being higher than the content of the compound represented by Formula 2 below in the residual zone. With this configuration, the durability of the polarizer can be improved, and the bleeding of the compound represented by Formula 1 and the compound represented by Formula 2 can be suppressed.

The film of this invention preferably contains a polymer composed of monomer having a molecular weight of 500 or less and showing an SP value difference of 2 or more away from the SP value of cellulose acylate. The SP value is a solubility parameter, and means a value calculated based on the Hoy method. In this invention, by using the compound represented by Formula 1, the compound represented by Formula 2 and the monomer described above, the compound represented by Formula 1 and the compound represented by Formula 2 will be more easily impregnated into the cellulose acylate film. As a consequence, the bleeding of the compound represented by Formula 1 and the compound represented by Formula 2 can be suppressed more effectively. The monomer will be detailed later.

Whether the content of the compound represented by Formula 1 below, in a zone ranging from one surface of the film to a depth of 10%, is higher than the content of the compound represented by Formula 1 below in the residual zone or not; and whether the content of the compound represented by Formula 2 below, in the zone ranging from the one surface of the film to a depth of 10%, is higher than the content of the compound represented by Formula 2 below in the residual zone or not, can be determined by measuring in what ratio the compound represented by Formula 1 and the compound represented by Formula 2 reside in the thicknesswise direction of the film. More specifically, by obliquely cutting a sample film so that the film may be viewed widely in the thickness-wise direction, and by measuring the sample by TOF-SIMS (time-of-flight secondary ion mass spectrometry), the intensity of generated ions of the compound represented by Formula 1 and the compound represented by Formula 2 may be evaluated in relation to the thicknesswise direction of the film, making it possible to measure in what ratio the compound represented by Formula 1 and the compound represented by Formula 2 reside in the thicknesswise direction of the film.

In the film of this invention, the compound represented by Formula 1 and the compound represented by Formula 2 may be contained in the cellulose acylate film, or may be reside on the surface of the cellulose acylate film, wherein it is preferably contained in the cellulose acylate film. The film, having the compound represented by Formula 1 and the compound represented by Formula 2 contained in the cellulose acylate film, may be manufactured by coating the compound represented by Formula 1 and the compound represented by Formula 2 on one surface of the cellulose acylate film, and allowing them to impregnate into the cellulose acylate film. When the compound represented by Formula 1 and the compound represented by Formula 2 are coated on one surface of the cellulose acylate film, under conditions which do not allow, or only limitedly allow, the compounds to impregnate into the cellulose acylate film, it is now possible to manufacture the film having the compounds resided on the surface of the cellulose acylate film.

In the film of this invention, the ratio of content of the compound represented by Formula 1 in a zone ranging from one surface of the film to a depth of 10%, relative to the total content of the compound represented by Formula 1 contained in the film, is preferably 70% by mass or more, and more preferably 80 to 100% by mass, meanwhile the ratio of content of the compound represented by Formula 1 in the residual zone is preferably 30% by mass or less, and more preferably 20 to 0% by mass.

In the film of this invention, the ratio of content of the compound represented by Formula 2 in a zone ranging from the one surface of the film to a depth of 10%, relative to the total content of the compound represented by Formula 2 contained in the film, is preferably 70% by mass or more, and more preferably 80 to 100% by mass, meanwhile the ratio of content of the compound represented by Formula 2 in the residual zone is preferably 30% by mass or less, and more preferably 20 to 0% by mass.

While the thickness of the film of this invention is not specifically limited, it is preferably 0.1 to 120 µm, more preferably 0.1 to 80 µm, and even more preferably 0.1 to 45 µm. In some cases, display devices are desired to be thin, so that the polarizing plate protective film is undesired to be thick. The thickness of film can be measured under a SEM (scanning electron microscope).

The film of this invention may be manufactured typically by coating a composition on one surface of the cellulose acylate film, the composition containing the compound represented by. Formula 1 below, the compound represented by Formula 2 below, and a monomer having a molecular weight of 500 or less and showing an SP value difference of 2 or more away from the SP value of cellulose acylate. The method is, however, not limited thereto. The method of manufacturing the film of this invention will be detailed later.

<<Cellulose Acylate>>

Cellulose acylate is an ester of cellulose and a carboxylic acid. In the cellulose acylate, all of, or part of hydrogen atoms in the hydroxy groups bound to the 2-position, 3-position and 6-position of the glucose unit are substituted by acyl group(s). The acyl group preferably has 2 to 22 carbon atoms, and more preferably 2 to 4 carbon atoms. The acyl group is exemplified by acetyl group, propionyl group, butyryl group, isobutyryl group, pivaloyl group, heptanoyl group, hexanoyl group, octanoyl group, decanoyl group, dodecanoyl group, tridecanoyl group, tetradecanoyl group, hexadecanoyl group, octadecanoyl group, cyclohexanecarbonyl group, oleoyl group, benzoyl group, naphthylcarbonyl group, and, cinnamoyl group. The acyl group is more preferably acetyl group, propionyl group, butyryl group, dodecanoyl group, octadecanoyl group, pivaloyl group, oleoyl group, benzoyl group, naphthylcarbonyl group, or cinnamoyl group, and most preferably acetyl group, propionyl group, or butyryl group.

The cellulose acylate may be an ester of cellulose and a plurality of species of carboxylic acids. In other words, cellulose acylate may be substituted by a plurality of species of acyl groups.

The cellulose acylate is preferably exemplified by the material below. Assuming now the degree of substitution with acetyl groups (having 2 carbon atoms) substituted on the cellulosic hydroxy groups in the cellulose acylate as SA, and the degree of substitution with acyl groups having 3 or more carbon atoms, substituted on the cellulosic hydroxy groups as SB, the intrinsic birefringence and retardation expression of the film can be increased by reducing (SA+SB), and the film-forming speed may be improved by increasing (SA+SB). Therefore the range of (SA+SB) is preferably 2.00<SA+SB<3.00, and more preferably 2.30<SA+SB<2.90.

The cellulose acylate can be synthesized by any of known methods. A basic principle of the method of synthesizing cellulose acylate is typically described in Nobuhiko MIGITA et al., *Mokuzai Kagaku* (in Japanese, "The Chemistry of Lumber"), p. 180-190 (published by Kyoritsu Shuppan Co., Ltd., 1968). A representative method of synthesizing the cellulose acylate is exemplified by liquid-phase acylation using a carboxylic anhydride, a carboxylic acid, and a sulfuric acid catalyst. More specifically, first, a cellulose material such as cotton linter or wood pulp is pre-treated with a proper amount of carboxylic acid such as acetic acid, and then esterified by putting it into a preliminarily cooled mixed solution for acylation, to thereby synthesize a complete cellulose acylate (the degrees of acyl substitution at the 2-, 3- and 6-positions total approximately 3.00). The mixed solution for acylation typically contains a carboxylic acid as the solvent, a carboxylic anhydride as the esterifying agent, and sulfuric acid as the catalyst. The carboxylic anhydride is normally used in a stoichiometrically excessive amount, relative to the total content of cellulose to be reacted therewith and water contained in the system.

Next, upon completion of the acylation reaction, water or water-containing acetic acid is added in order to hydrolyze the excessive carboxylic acid which remains in the system. In order to partially neutralize the esterification catalyst, an aqueous solution containing a neutralizing agent (for example, carbonate, acetate, hydroxide or oxide of calcium, magnesium, iron, aluminum or zinc) may be added. The obtained complete cellulose acylate is then saponified and ripened, by keeping the system at 20 to 90° C., under the presence of a small amount of acylation catalyst (typically, a residual sulfuric acid), so as to convert it to a cellulose acylate having a desired degree of acyl substitution and a desired degree of polymerization. Upon yielding of the desired cellulose acylate, the cellulose acylate is isolated by completely neutralizing the catalyst which remains in the system using the neutralizing agent or the like, or, by pouring the cellulose acylate solution into water or dilute acetic acid without neutralizing the catalyst (or, pouring water or dilute acetic acid into the cellulose acylate solution), followed by washing and stabilization treatment to thereby obtain a cellulose acylate of interest.

The degree of polymerization of cellulose acylate is preferably 150 to 500 in terms of viscosity-average degree of polymerization, more preferably 200 to 400, and even more preferably 220 to 350. The viscosity-average degree of polymerization may be measured according to the description regarding the intrinsic viscosity method by UDA et al. (Kazuo UDA, Hideo SAITO, *FIBER, The Society of Fiber Science and Technology, Japan*, Vol. 18, No. 1, p. 105-120, 1962). The method of measuring the viscosity average degree of polymerization is also described in JP-A-H09-95538.

The cellulose acylate with a small content of low-molecular components has a large value of average molecular weight (degree of polymerization), but has a value of viscosity lower than that of ordinary cellulose acylate. Such cellulose acylate with a small content of low-molecular components may be obtained by removing the low-molecular components from a cellulose acylate having been synthesized by an ordinary method. The low-molecular components may be removed by washing the cellulose acylate using an appropriate organic solvent. Alternatively, the cellulose acylate with a small content of low-molecular components may be obtained by synthesis. When the cellulose acylate with a small content of low-molecular components is synthesized, the amount of the sulfuric acid catalyst used in the acylation is preferably controlled to 0.5 to 25 parts by mass relative to 100 parts by mass of cellulose. With the amount of sulfuric acid catalyst controlled in the above-described range, the cellulose acylate which is preferable also in terms of molecular weight distribution (having a uniform molecular weight distribution) can be synthesized. The degree of polymerization and the molecular weight distribution of the cellulose acylate can be measured typically by gel permeation chromatography (GPC).

The source cotton and the method of synthesis of cellulose ester are also described in JIII Journal of Technical Disclosure (No. 2001-1745, issued on Mar. 15, 2001, Japan Institute of Invention and Innovation), p. 7-12.

The cellulose acylate used here may have a form of powder or particle, or may even be pelletized. The water content of the cellulose acylate is preferably 1.0% by mass or less, more preferably 0.7% by mass or less, and most preferably 0.5% by mass or less. The water content may even be 0.2% by mass or less on occasions. If the water content of the cellulose acylate is not controlled in the preferred ranges, the cellulose acylate is preferably used after dried with a dry air or under heating.

The film of this invention preferably contains 5 to 99% by mass of cellulose acylate, more preferably 20 to 99% by mass, and particularly 50 to 95% by mass.

<<Compound Represented by Formula 1>>

The film of this invention contains the compound represented by Formula 1.

$$X-L-(R^1)_n \quad \text{Formula 1:}$$

In Formula 1, X represents an acidic group having an acid dissociation constant at 25° C. of 5.5 or less, L represents a single bond or divalent or higher-valent linking group, $R^1$ represents an alkyl group having 6 to 30 carbon atoms, an alkenyl group having 6 to 30 carbon atoms, an alkynyl group having 6 to 30 carbon atoms, an aromatic hydrocarbon group having 6 to 30 carbon atoms or a heterocyclic group having 6 to 30 carbon atoms; n is 1 when L stands for a single bond, and is (valence of L−1) when L stands for a divalent or higher-valent linking group.

The compound represented by Formula 1 is described in JP-A-2011-237580, the entire contents of which are incorporated into this specification.

In Formula 1, X represents an acid having an acid dissociation constant of 5.5 or less, and is preferably a carboxy group, sulfonic acid group, sulfinic acid group, phosphoric acid group, sulfonimide group or ascorbic acid group. In the context of this specification, values of the acid dissociation constant at 25° C. are cited from *Kagaku Binran* (in Japanese, *"Handbook of Chemistry"*), published by Maruzen Co., Ltd.

In Formula 1, $R^1$ represents an alkyl group having 6 to 30 carbon atoms (which may have a substituent), an alkenyl group having 6 to 30 carbon atoms (which may have a substituent), an alkynyl group having 6 to 30 carbon atoms (which may have a substituent), an aromatic hydrocarbon group having 6 to 30 carbon atoms (which may have a substituent), or a heterocyclic group having 6 to 30 carbon atoms (which may have a substituent). The substituent is exemplified by halogen atom, aromatic hydrocarbon group, heterocyclic group, alkoxy group, aryloxy group, alkylthio group, arylthio group, acyl group, hydroxy group, acyloxy group, amino group, alkoxycarbonyl group, acylamino group, oxycarbonyl group, carbamoyl group, sulfonyl group, sulfamoyl group, sulfonamide group, sulfuryl group, and carboxy group. When n is 2 or more, n (R$^1$)s may be same, or may be different.

L in Formula 1 preferably represents a single bond; or, a divalent or higher-valent linking group selected from the group of units below; or a divalent or higher-valent linking group obtained by combining two or more units selected from the group of units below.
Units:
—O—, —CO—, —N(—R$^2$)— (R$^2$ represents an alkyl group having 1 to 5 carbon atoms), —CH=CH—, —CH(OH)—, —CH$_2$—, —SO$_2$—,

L may have an additional substituent exemplified by those which may be possessed by R$^1$ without special limitation, and among them, —OH group is preferable.

Among them, L is more preferably a linking group which contains a group assignable to glycerin.

More specifically, L preferably represents any of the structures below, where each of p, q and r independently represents an integer of 1 to 40, more preferably 1 to 20, even more preferably 1 to 10, and particularly 1 to 6. It is particularly preferable that q represents 2 to 4.
—(CH$_2$)$_p$—CO—O—(CH$_2$)$_q$—O—;
—(CH$_2$)$_p$—CO—O—(CH$_2$)$_q$—(CH(OH))—(CH$_2$)$_r$—O—;
—(CH$_2$)$_p$—CO—O—(CH$_2$)$_q$—(CH(OCO—R$^3$))—(CH$_2$)$_r$—O—;
—(CH$_2$)$_p$—CO—O—(CH$_2$)$_q$—(CH(OH))—(CH$_2$)$_r$—O—CO—;
—(CH$_2$)$_p$—CO—O—(CH$_2$)$_q$—(CH(OCO—R$^3$))—(CH$_2$)$_r$—O—CO—.

Note that R$^3$ contained in L specifically exemplified above is synonymous to R$^1$ in Formula 1. More specifically, notation of R$^3$ in the linking group represented above by
—(CH$_2$)$_p$—CO—O—(CH$_2$)$_q$—(CH(OCO—R$^3$))—(CH$_2$)$_r$—O— is given merely for convenience, and the actual linking group L means the moiety excluding R$^3$. In other words, L in this case is trivalent. The linking group may be given as X-L-(R$^1$)$_2$ when expressed in the form of Formula 1 [where, L represents —(CH$_2$)$_p$—CO—O—(CH$_2$)$_q$—(CH(OCO—))—(CH$_2$)$_r$—O—], and therefore the linking group L in this case is a trivalent linking group.

L and X are preferably bound by an ester bond or amido group.

L and R$^1$ are preferably bound by an ester bond, ether bond or amido bond.

Preferable and specific examples of the compound represented by Formula 1 are described in paragraph [0023] of JP-A-2011-237580.

The compound represented by Formula 1 is preferably a partial derivative of polybasic organic acid. The partial derivative of polybasic organic acid means a compound configured so that one fatty acid molecule and polybasic organic acids molecule(s) are bound by ester bonds to one polyhydric alcohol molecule, thereby having at least one non-substituted acidic group assignable to the polybasic carboxylic acid. In the context of this specification, the fatty acid means aliphatic monocarboxylic acid. In other words, the fatty acid in the context of this specification is not limited to so-called higher aliphatic, and may contain lower fatty acids having 12 or less carbon atoms, such as acetic acid and propionic acid. The polybasic carboxylic acid means divalent or higher-valent carboxylic acid, and polyhydric alcohol means dihydric or higher-hydric alcohol.

The partial derivative of the polybasic organic acid is preferably a partial derivative of polybasic carboxylic acid. More specifically, the organic acid represented by Formula 1 above is configured so that one fatty acid molecule and one polybasic carboxylic acid molecule are bound by ester bonds to one polyhydric alcohol molecule, and preferably has at least one non-substituted carboxy group assignable to the polybasic carboxylic acid. The polybasic carboxylic acid used for the partial derivative of polybasic carboxylic acid is preferably succinic acid, citric acid, tartaric acid, diacetyltartaric acid, malic acid and adipic acid.

The polyhydric alcohol used for the partial derivative of polybasic organic acid is not specifically limited so long as it is a divalent or higher-valent alcohol, and is exemplified by adonitol, arabitol, ethylene glycol, diethylene glycol, triethylene glycol, tetraethylene glycol, 1,2-propanediol, 1,3-butanediol, 1,4-butanediol, dibutylene glycol, 1,2,4-butanetriol, 1,5-pentanediol, 1,6-hexanediol, hexanetriol, galactitol, mannitol, 3-methylpentane-1,3,5-triol, pinacol, sorbitol, trimethylolpropane, trimethylolethane, xylitol, and glycerin. Among them, glycerin is preferable, and the compound represented by Formula 1 is preferably an organic acid glyceride.

The compound represented by Formula 1 is preferably an organic acid glyceride (fatty acid-organic acid ester of glycerin) in which an acidic group X of the organic acid is bound to the hydrophobic moiety R$^1$, while placing in between a linking group (L) which contains a glycerin-derived group. Now the organic acid glyceride in the context of this specification refers to a compound which is configured so that one or two, out of three, hydroxy groups of glycerin form ester bonds with the fatty acid, and the one or two, among the residual, hydroxy groups form ester bonds with the polybasic organic acid, thereby having acidic groups assignable to the polybasic organic acid.

Among them, organic acid monoglyceride or organic acid diglyceride is more preferable, and organic acid monoglyceride is particularly preferable. The organic acid monoglyceride in the context of this specification is referred to a compound configured so that one, out of three, hydroxy groups of glycerin forms an ester bond with the fatty acid, and one or two, among the residual, hydroxy groups form ester bonds with the polybasic organic acid, thereby having acidic groups assignable to the polybasic organic acid. The organic acid diglyceride in the context of this specification is referred to a compound configured so that two, out of three, hydroxy groups of glycerin form ester bonds with the fatty acid, and the residual one hydroxy group forms an ester bond with the polybasic organic acid, thereby having acidic group(s) assignable to the polybasic organic acid.

Among the organic acid monoglycerides described above, particularly preferable is a sort of compound configured so that one, out of three, hydroxy group of glycerin forms an ester bond with the fatty acid, one of the residual hydroxy groups remains unsubstituted, and the residual one hydroxy group forms an ester bond with the polybasic organic acid, thereby having acidic groups assignable to the polybasic organic acid. The hydroxy group of the organic acid monoglyceride which is esterified with the fatty acid preferably resides at an asymmetrical position (the position for so-called, α-monoglyceride), and, the hydroxy group of the organic acid monoglyceride which is esterified with the polybasic organic acid again preferably resides at an asymmetrical position (the position for so-called, α-monoglyceride). In other words, among the organic acid monoglycerides described above, preferable is a sort of compound having a non-substituted hydroxy group, and configured so that the carbon atom having directly bound thereon a hydroxy group which is esterified with the fatty acid, and the carbon atom having directly bound thereon a hydroxy group esterified with the polybasic organic acid, are not adjacent to each other.

Among the organic acid monoglycerides described above, monoglyceride of polybasic carboxylic acid is particularly preferable. The monoglyceride of polybasic carboxylic acid refers to a compound in which at least one carboxy group of the polybasic carboxylic acid remains unsubstituted, and other carboxy group is substituted by a monoglyceride. In short, particularly preferable is a carboxy group-containing organic acid monoglyceride configured so that one fatty acid molecule and one polybasic carboxylic acid molecule are bound to one glycerin molecule.

The polybasic carboxylic acid used for the monoglyceride of polybasic carboxylic acid is preferably, but not specifically limited to, succinic acid, citric acid, tartaric acid, diacetyltartaric acid, malic acid or adipic acid.

The fatty acid used for the monoglyceride of polybasic carboxylic acid is preferably, but not limited to, saturated or unsaturated fatty acid having 8 to 22 carbon atoms, and is specifically exemplified by caprylic acid, capric acid, lauric acid, myristic acid, palmitic acid, stearic acid, behenic acid and oleic acid.

The carboxy group-containing organic acid monoglyceride usable in this invention is detailed in paragraphs [0030] to [0034] of JP-A-2011-237580.

<<Compound Represented by Formula 2>>

The film of this invention contains the compound represented by Formula 2. Formula 2:

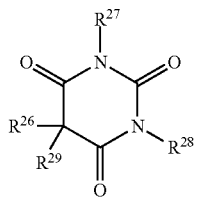

In Formula 2, $R^{26}$ represents an alkyl group, alkynyl group or aromatic hydrocarbon group, each of $R^{27}$ and $R^{28}$ independently represents a hydrogen atom, alkyl group, alkenyl group, aromatic hydrocarbon group or aromatic heterocyclic group, $R^{29}$ represents a hydrogen atom, alkyl group or aromatic hydrocarbon group; and $R^{26}$, $R^{27}$, $R^{28}$ and $R^{29}$ may independently have a substituent.

In Formula 2, the alkyl group may be any of straight chain-like, branched, and cyclic ones. The number of carbon atoms of the straight chain-like alkyl group is preferably 1 to 20, more preferably 1 to 10, even more preferably 1 to 5, and particularly 1 to 3. The straight chain-like alkyl group is preferably methyl group or ethyl group. The number of carbon atoms of the branched alkyl group is preferably 3 to 20, more preferably 3 to 10, and even more preferably 3 to 5. The number of carbon atoms of the cyclic alkyl group is preferably 3 to 20, more preferably 3 to 10, even more preferably 4 to 8, and particularly 5 or 6. The cyclic alkyl group is exemplified by cyclopropyl group, cyclopentyl group, and cyclohexyl group, wherein cyclohexyl group is particularly preferable.

In Formula 2, the number of carbon atoms of the alkynyl group is preferably 2 to 20, more preferably 2 to 10, and even more preferably 2 to 5.

In Formula 2, the number of carbon atoms of the aromatic hydrocarbon group is preferably 6 to 20, more preferably 6 to 16, and even more preferably 6 to 12. The aromatic hydrocarbon group may be monocyclic or polycyclic, and is exemplified by phenyl group and naphthyl group, wherein phenyl group is preferable.

In Formula 2, the number of carbon atoms of the alkenyl group is preferably 2 to 20, more preferably 2 to 10, and even more preferably 2 to 5. The alkenyl group is exemplified by vinyl group and allyl group.

In Formula 2, the number of carbon atoms of the aromatic heterocyclic group is preferably 6 to 20, more preferably 6 to 16, and even more preferably 6 to 12. The aromatic heterocyclic group may be monocyclic or polycyclic.

Each of $R^{26}$, $R^{27}$, $R^{28}$ and $R^{29}$ may independently have a substituent. The substituent is exemplified by, but not specifically limited to, straight chain-like, branched or cyclic alkyl group (preferably having 1 to 10 carbon atoms), alkenyl group (preferably having 2 to 20 carbon atoms), alkynyl group (preferably having 2 to 20 carbon atoms), aryl group (preferably having 6 to 26 carbon atoms), heterocyclic group, alkoxy group (preferably having 1 to 20 carbon atoms), aryloxy group (preferably having 6 to 26 carbon atoms), alkylthio group (preferably having 1 to 20 carbon atoms), arylthio group (preferably having 6 to 26 carbon atoms), sulfonyl group (preferably having 1 to 20 carbon atoms), acyl group (preferably having 20 or less carbon atoms), alkoxycarbonyl group (preferably having 2 to 20 carbon atoms), aryloxycarbonyl group (preferably having 7 to 20 carbon atoms), amino group (preferably having 0 to 20 carbon atoms), sulfonamide group (preferably having 0 to 20 carbon atoms), sulfamoyl group (preferably having 0 to 20 carbon atoms), acyloxy group (preferably having 1 to 20 carbon atoms), carbamoyl group (preferably having 1 to 20 carbon atoms), acylamino group (preferably having 1 to 20 carbon atoms), cyano group, hydroxy group, mercapto group, carboxyl group, and halogen atom. These substituents may further be substituted by these substituents.

In the compound represented by Formula 2, any one of $R^{26}$, $R^{27}$, $R^{28}$ and $R^{29}$ preferably represents an alkyl group substituted by a group having a cyclic structure. In particular, $R^{26}$ or $R^{29}$ preferably represents an alkyl group substituted by a group having a cyclic structure. The ring in the group having a cyclic structure is preferably benzene ring, naphthalene ring, cyclopentane ring, cyclohexane ring, or nitrogen-containing heteroaromatic ring (for example, pyrrole ring, pyrazole ring, imidazole ring, oxazole ring, thiazole ring, pyridine ring, indole ring, isoindole ring). In the compound represented by Formula 2, each of at least two of $R^{26}$, $R^{27}$, $R^{28}$ and $R^{29}$ preferably represents an alkyl group having a cyclic structure as a substituent. It is further preferable that each of $R^{26}$ and $R^{27}$ independently represents an alkyl group or aromatic group. In the compound represented by Formula 2, the total number of cyclic structures contained in the substituents on $R^{26}$, $R^{27}$, $R^{28}$ and $R^{29}$ is preferably 4 or less.

The compound represented by Formula 2 preferably has a molecular weight of 250 to 1200, more preferably 300 to 800, and even more preferably 350 to 600.

Specific examples of the compound represented by Formula 2 will be enumerated below, without intention of limitation.
A-1
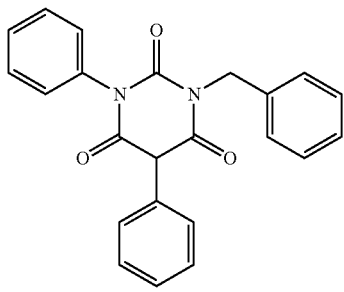
A-2
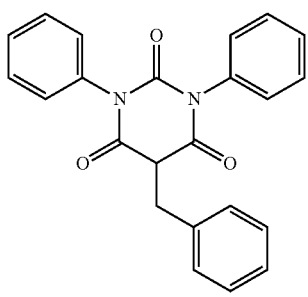
A-3
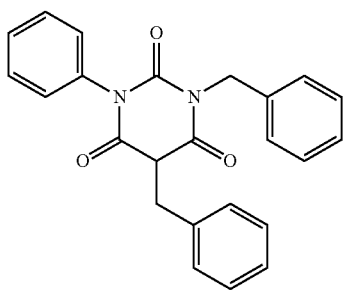
A-4
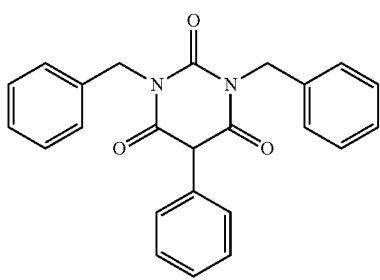
A-5
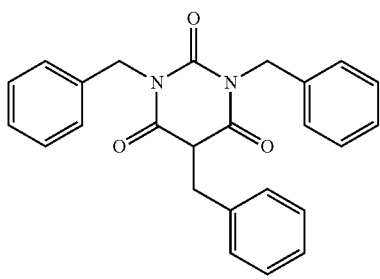
-continued
A-6
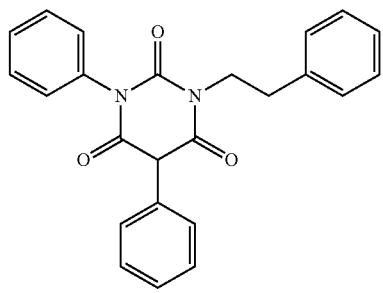
A-7
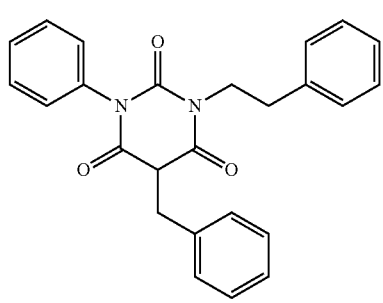
A-8
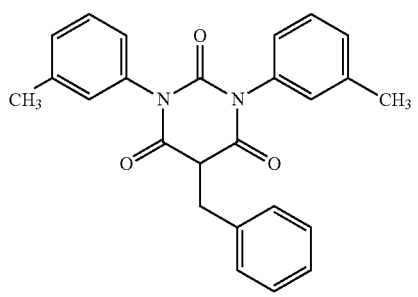
A-9
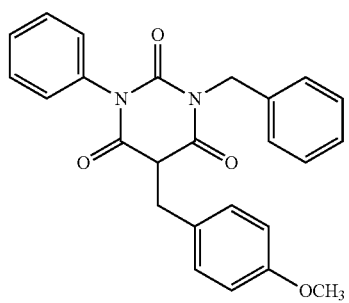
A-10
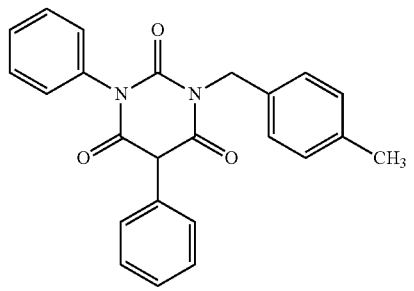

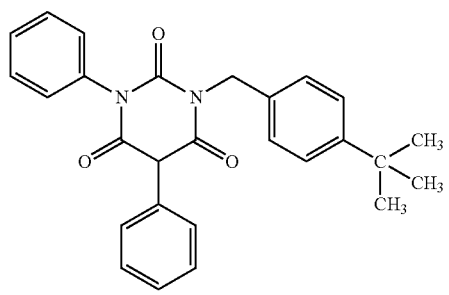
A-11
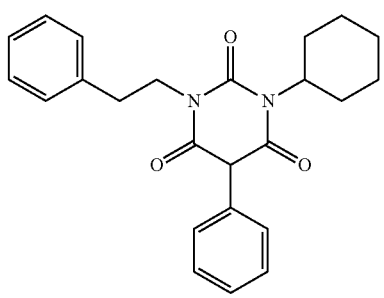
A-16
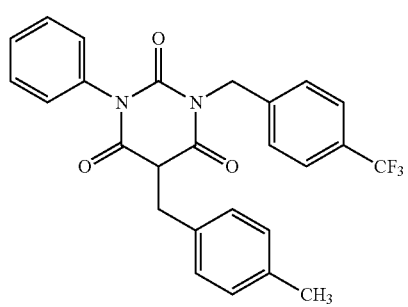
A-12
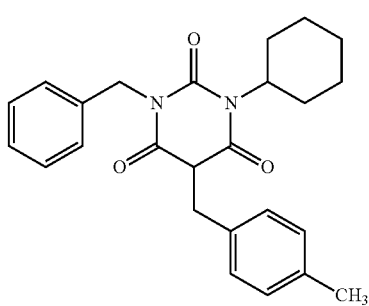
A-17
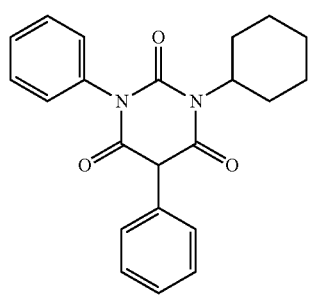
A-13
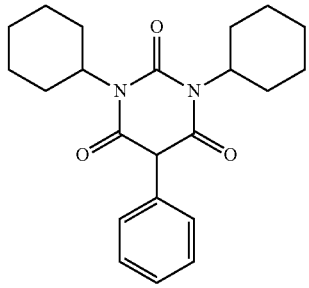
A-18
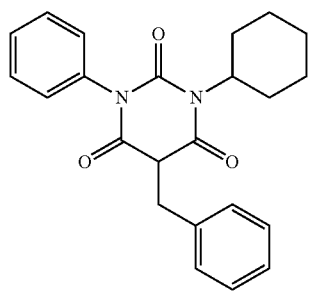
A-14
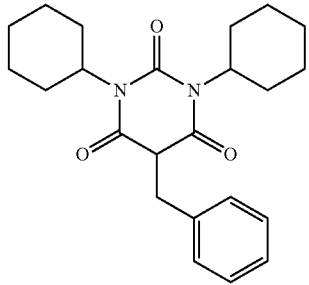
A-19
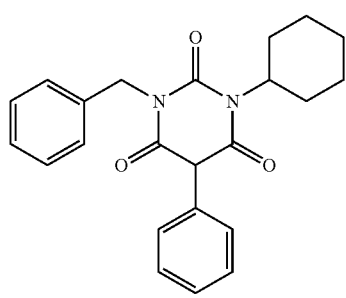
A-15
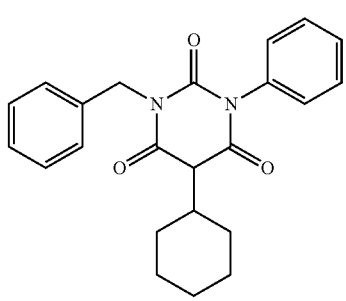
A-20

A-21 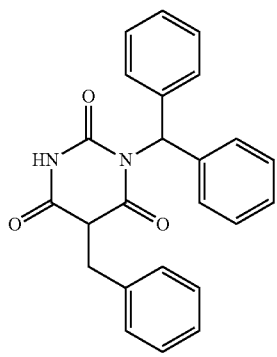
A-22 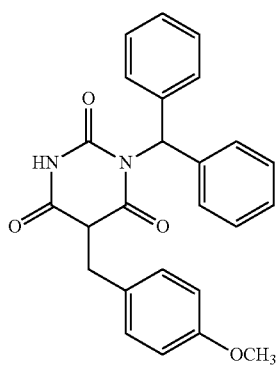
A-23 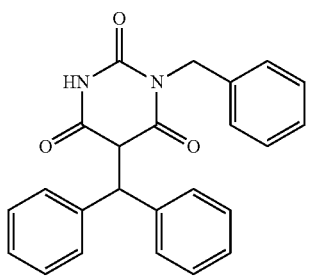
A-24 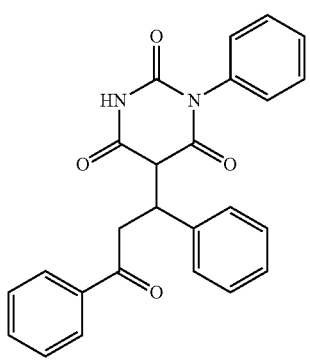
A-25 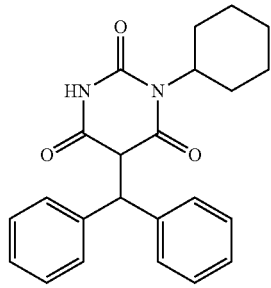
A-26 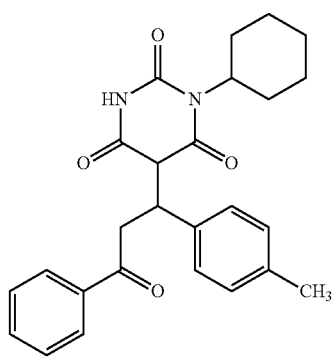
A-27 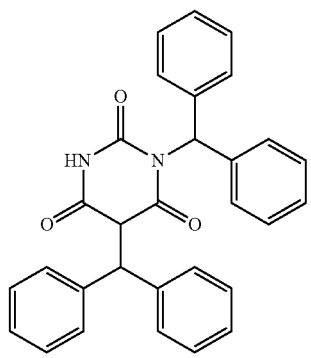
A-28 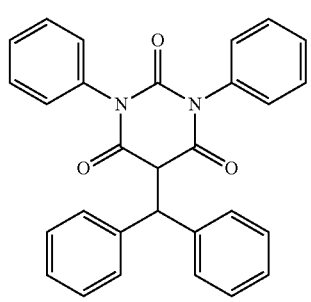

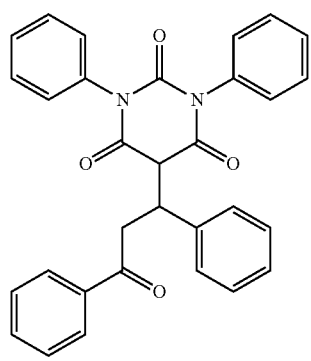
A-29
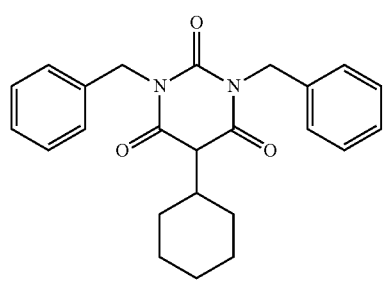
A-30
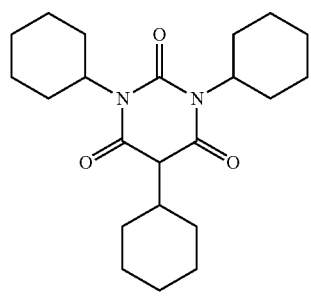
A-31
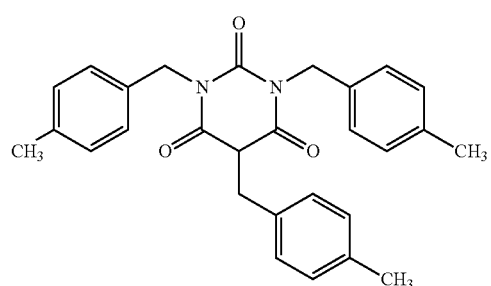
A-32
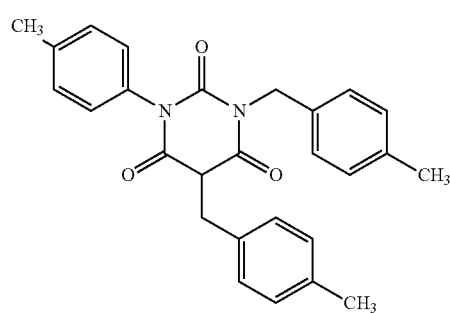
A-33
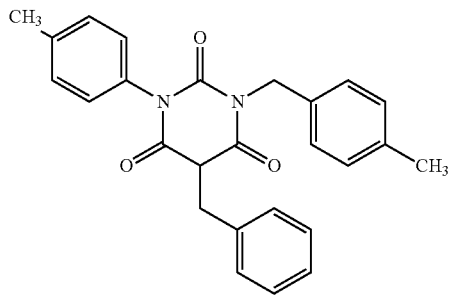
A-34
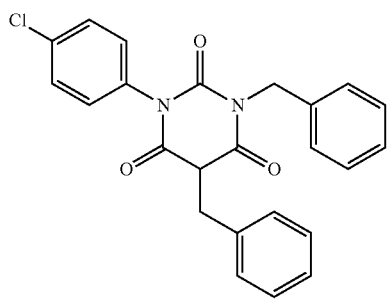
A-35
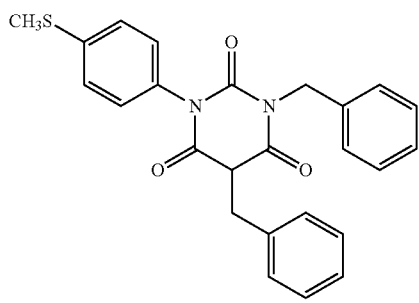
A-36
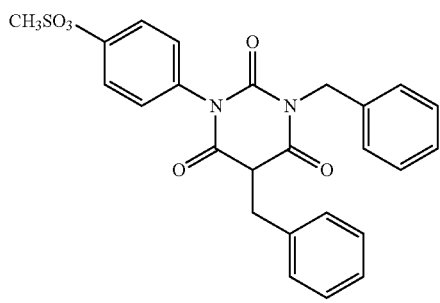
A-37
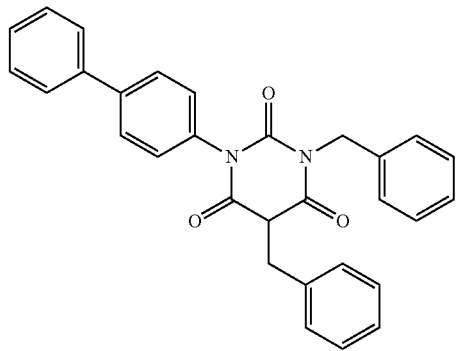
A-38

A-39
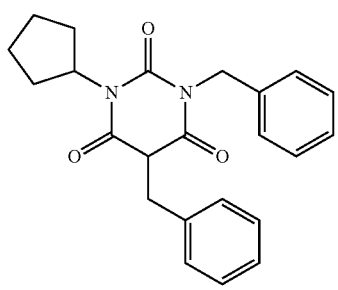
A-40
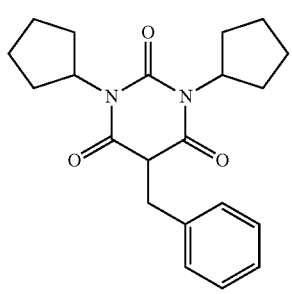
A-41
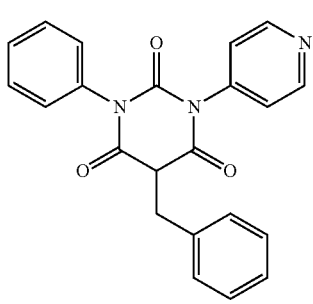
A-42
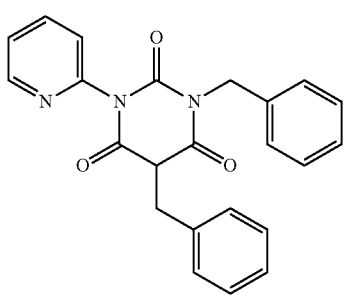
A-43
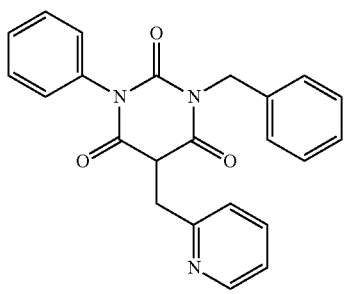
A-44
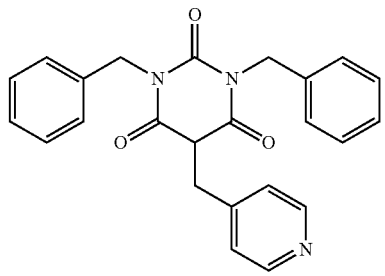
A-45
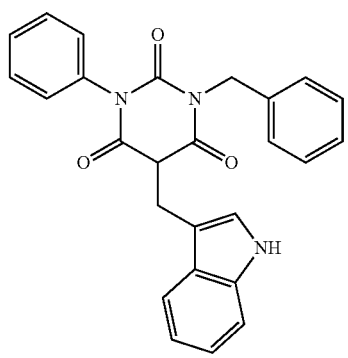
A-46
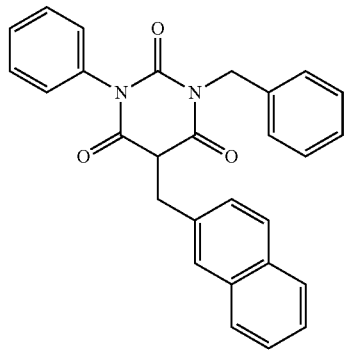
A-47
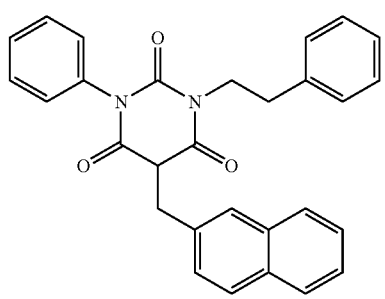
A-48
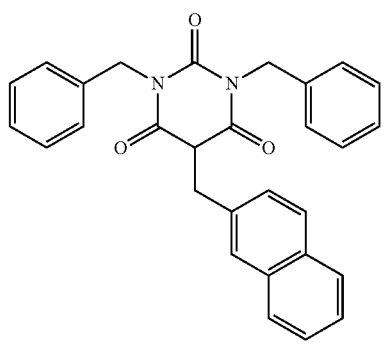

The compound represented by Formula 2 can be added in the form of hydrate, solvate or salt. The hydrate may contain an organic solvent, and the solvate may contain water.

The compound represented by Formula 2 can be synthesized by a method of synthesizing barbituric acid based on condensation of a urea derivative and a malonic acid derivative. Bartituric acid, having two substituents on the nitrogen atoms, can be obtained by heating N,N'-disubstituted urea with malonyl chloride; or by mixing N,N'-disubstituted urea, malonic acid and an activator such as acetic anhydride, followed by heating. Methods described, for example, in *Journal of the American Chemical Society*, Vol. 61, p. 1015 (1939), *Journal of Medicinal Chemistry*, Vol. 54, p. 2409 (2011), *Tetrahedron Letters*, Vol. 40, p. 8029 (1999), and International Patent WO2007/150011 pamphlet, may preferably be used.

<<Monomer Having Molecular Weight of 500 or Less and Showing SP Value Difference of 2 or More Away from that of Cellulose Acylate>>

The film of this invention may additionally contain a polymer composed of monomer having a molecular weight of 500 or less and showing an SP value difference of 2 or more away from the SP value of cellulose acylate. For example, when the film of this invention is manufactured using a composition which contains the compound represented by Formula 1, the compound represented by Formula 2, and a monomer having a molecular weight of 500 or less and showing an SP value difference of 2 or more away from the SP value of cellulose acylate, the film of this invention will eventually contain a polymer of such monomers.

The monomer preferably has a molecular weight of 500 or less, more preferably 50 to 500, and even more preferably 100 to 400. With the molecular weight of the monomer controlled to 500 or less, the compound represented by Formula 1 and the compound represented by Formula 2 will be more easily impregnated into the cellulose acylate film.

The monomer preferably shows an SP value difference of 2 or more, and more preferably 2 to 10, away from that of cellulose acylate. With the SP value of the monomer controlled to satisfy these ranges, the cellulose acylate and the monomer will be less miscible in the cellulose acylate film, and thereby, a boundary will more likely be formed between a zone where the compound represented by Formula 1 and the compound represented by Formula 2 are abundant, and a zone where the compound represented by Formula 1 and the compound represented by Formula 2 are scarce, in the cellulose acylate film. The SP value of the cellulose acylate varies depending on species of the substituent, degree of substitution, molecular weight and so forth. In this invention, since the difference between the SP value of monomer and the SP value of cellulose acylate is preferably 2 or more. Thus, the species of suitable monomer is determined correspondingly to the SP value of the cellulose acylate to be used.

As for examples of the monomer, for example, the description in paragraphs [0022] to [0038] of JP-A-2013-62489, and paragraphs [0025] to [0028] of JP-A-2012-141459 may be referred to, the contents of which are incorporated into this specification.

The monomer preferably has two or less unsaturated double bond in one molecule.

The monomer is exemplified by (meth)acrylate diesters of alkylene glycol, such as neopentyl glycol diacrylate, 1,6-hexanediol di(meth)acrylate, ethylene glycol di(meth)acrylate, and propylene glycol di(meth)acrylate; (meth)acrylate diesters of polyoxyalkylene glycol, such as polyethylene glycol di(meth)acrylates having 8 or less ethylene repeating units such as diethylene glycol di(meth)acrylate and triethylene glycol di(meth)acrylate, and, polypropylene glycol di(meth)acrylate having 6 or less propylene repeating units such as dipropylene glycol di(meth)acrylate and tripropylene glycol di(meth)acrylate; (meth)acrylate diesters of polyhydric alcohol such as pentaerythritol di(meth)acrylate, 1,4-cyclohexane diacrylate, and tricyclodecanedimethanol di(meth)acrylate; (meth)acrylate diesters of ethylene oxide adducts such as 2,2-bis{4-(methacryloxy.ethoxy)phenyl}propane, and 2,2-bis{4-(acryloxy.diethoxy)phenyl}propane; and monofunctional (meth)acrylate esters such as isobornyl (meth)acrylate, octyl (meth)acrylate, decyl (meth)acrylate, aliphatic epoxy (meth)acrylate, ethoxylated phenyl (meth)acrylate, β-carboxyethyl (meth)acrylate, methoxypolyethylene glycol (meth)acrylate, phenoxypolyethylene glycol (meth)acrylate, 2-(meth)acryloyloxyethyl succinate, glycerin mono (meth)acrylate, 2-hydroxyethyl (meth)acrylate, cyclohexyl (meth)acrylate, and lauryl (meth)acrylate. Among these monomers, those showing an SP value difference of 2 or more away from the SP value of cellulose acylate may be selected and used. Glycerin monomethacrylate (under trade names of Blemmer GLM, Blemmer DMA, etc.) are preferred as the monomer.

The content of the polymer composed of the above-described monomers, in the film of this invention, is preferably 0.1 to 20 parts by mass relative to 100 parts by mass of cellulose acylate, and more preferably 0.2 to 15 parts by mass.

<<Additional Component>>

The film of this invention may contain an additional component other than those described above. The additional component includes retardation expressing agent, particle, plasticizer, UV absorber, fluorine-containing surfactant, releasing agent, antidegradation agent, infrared absorber and so forth. As for the additional component, the description of, for example, JP-A-2005-104148 may be referred to.

<<<Retardation Expressing Agent>>>

A compound having at least two aromatic rings may be used as the retardation expressing agent.

The compound having at least two aromatic rings is exemplified, for example, by triazine compounds described in JP-A-2003-344655, rod-like compounds described in JP-A-2002-363343, and liquid crystal compounds described in JP-A-2005-134884 and JP-A-2007-119737. The triazine compounds or the rod-like compounds are more preferable.

The compound represented by Formula (MA) or (MB) is preferably contained as the retardation expressing agent.

Formula (IIIA)

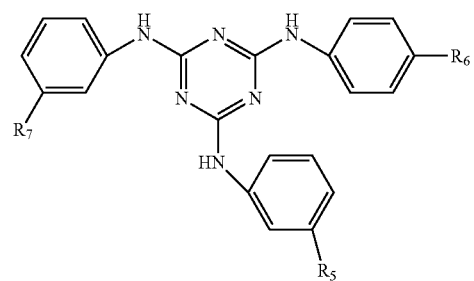

Each of $R_5$ to $R_7$ independently represents —$OCH_3$ or —$CH_3$.

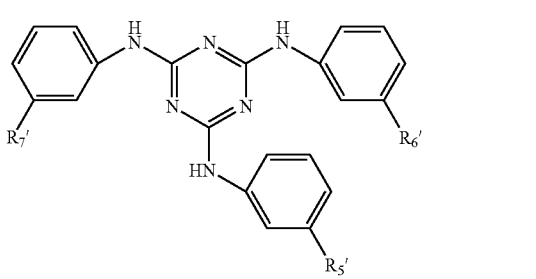

Formula (IIIB)

Each of $R_5'$ to $R_7'$ independently represents —OCH$_3$ or —CH$_3$.

The content of the retardation expressing agent, relative to 100 parts by mass of cellulose acylate is preferably 0.05 to 10 parts by mass, and more preferably 0.5 to 8 parts by mass.

<<<Particle>>>

The film of this invention may contain a particle, from the viewpoints of slippage and stable manufacturing of the film. The average particle size of the particle is preferably 5 to 3000 nm. The particle may alternatively be referred to as matting agent, and may be made of inorganic compound or organic compound. Preferable examples of the particle may be referred, for example, to the particles described in paragraphs [0024] to [0027] of JP-A-2012-177894 (subtitled as "Matting Agent Particle"), and paragraphs [0122] and [0123] of JP-A-2012-181516 (subtitled as "Matting Agent").

The content of the particle, relative to 100 parts by mass of cellulose acylate, is preferably 0.05 to 10 parts by mass, and more preferably 0.5 to 8 parts by mass.

<<<Plasticizer>>>

Phosphate ester or carboxylate ester is used as the plasticizer. Examples of the phosphate ester include triphenyl phosphate (TPP) and tricresyl phosphate (TCP), cresyl diphenyl phosphate, octyl diphenyl phosphate, diphenyl biphenyl phosphate, trioctyl phosphate, and tributyl phosphate. As the carboxylate ester, phthalate ester and citrate ester are representative. Examples of the phthalate ester include dimethyl phthalate (DMP), diethyl phthalate (DEP), dibutyl phthalate (DBP), dioctyl phthalate (DOP), diphenyl phthalate (DPP) and diethyl hexyl phthalate (DEHP). Examples of the citrate ester include triethyl O-acetylcitrate (OACTE), tributyl O-acetylcitrate (OACTB), acetyl triethyl citrate, and acetyl tributyl citrate. Each of these preferable plasticizers, excluding TPP (melting point≈50° C.), exists in the form of liquid at 25° C., and has a boiling point of 250° C. or above.

<Composition>

According to this invention, there is provided a composition which contains the compound represented by Formula 1 above, the compound represented by Formula 2 above, and a polymer composed of monomer having a molecular weight of 500 or less and showing an SP value difference of 2 or more away from the SP value of cellulose acylate. The film of this invention may be manufactured by using the composition of this invention. The film of this invention is, however, not limited to a film manufactured by using the composition of this invention.

A mechanism by which the film of this invention may be manufactured by using the composition of this invention is estimated as follows. Compound having a small molecular weight can easily impregnate into cellulose acylate, and as a result of impregnation of the compound, also the other components (the compound represented by Formula 1, the compound represented by Formula 2, etc.) having been dissolved in the coating liquid may be entrained into cellulose acylate, to thereby allow themselves to reside in a concentrated manner in the surface part of cellulose acylate. In contrast for the case where the compound represented by Formula 1 and the compound represented by Formula 2 are directly added to cellulose acylate, they may uniformly distribute over the entire portion, so that effect of the compound represented by Formula 1 and the compound represented by Formula 2 will be reduced as compared with the case where they are concentrated in the surface part as described above. In addition, the compound represented by Formula 1 and the compound represented by Formula 2 may be suppressed from leaching, as a result of polymerization of the monomers under UV irradiation.

Specific examples and preferable ranges of the compound represented by Formula 1, the compound represented by Formula 2, and the monomer having a molecular weight of 500 or less and showing an SP value difference of 2 or more away from the SP value of cellulose acylate, in the composition of this invention, are as described previously in this specification.

The content of the compound represented by Formula 1 in the composition of this invention is preferably 1 to 60% by mass relative to the total solid content in the composition, and more preferably 10 to 30% by mass.

The content of the compound represented by Formula 2 in the composition is preferably 1 to 60% by mass relative to the total solid content in the composition, and more preferably 10 to 30% by mass.

The content of the monomers in the composition is preferably 1 to 60% by mass relative to the total solid content in the composition, and more preferably 25 to 45% by mass.

The composition of this invention may additionally contain particle, polymerization initiator, solvent and so forth, besides the components described above.

The particle usable here may be same as those previously described in this specification. Silica particle is particularly preferable. The content of the particle in the composition is preferably 1 to 35% by mass relative to the total solid content of the composition, and more preferably 5 to 25% by mass.

As the solvent, usable are ester, ketone, ether, alcohol, hydrocarbon and so forth. In particular, mixed solvents with methyl acetate, methyl ethyl ketone and propylene glycol 1-monomethyl ether 2-acetate are preferable.

The content of solvent in the composition is preferably 30 to 99% by mass, and more preferably 60 to 95% by mass. Only a single species, or two or more species of the solvent may be used. When two or more species are used, the total content preferably satisfies the above-described ranges.

The polymerization initiator is preferably a photo polymerization initiator. The photo polymerization initiator is exemplified by acetophenones, benzoins, benzophenones, phosphine oxides, ketals, anthraquinones, thioxanthones, azo compounds, peroxides, 2,3-dialkyl dione compounds, disulfide compounds, fluoroamine compounds, aromatic sulfoniums, lophine dimers, onium salts, borate salts, activated esters, activated halogens, inorganic complex, and coumarins. Specific examples, preferable modes and commercial products of the photo polymerization initiator are described in paragraphs [0133] to [0151] of JP-A-2009-098658, and they may preferably be used also in this invention. Various examples are also described in "Saishin UV Koka Gijyutu (in Japanese, *The Latest UV Curing Technologies*)", published by Technical Information Institute Co., Ltd. (1991), p. 159, and, "Shigaisen Koka Shisutemu (in Japanese, *UV Curing System*)", written by Kiyomi KATO, (1989, published by Sogo Gijyutu Center), p. 65-148, which are useful in this invention.

The content of the polymerization initiator in the composition is preferably 0.5 to 8% by mass relative to the total solid content in the composition, and more preferably 1 to 5% by mass.

A method of manufacturing the film of this invention using the composition of this invention will be detailed later.

<Method of Manufacturing Film>

While the method of manufacturing the film of this invention is not specifically limited, a typical method may include coating a composition on one surface of a cellulose acylate film, the composition containing the compound represented by Formula 1, the compound represented by Formula 2, and a monomer having a molecular weight of 500 or less and showing an SP value difference of 2 or more away from the SP value of cellulose acylate; and allowing the coated monomer to polymerize. Note, however, that the method of manufacturing does not always necessarily use the monomers described above. For example, the film may alternatively be manufactured by coating a composition, which contains the compound represented by Formula 1 and the compound represented by Formula 2, over one surface of the cellulose acylate film.

<<Formation of Cellulose Acylate Film>>

The cellulose acylate film used in this invention may be manufactured by solution casting using a cellulose acylate solution.

The cellulose acylate solution may be prepared referring, for example, to paragraphs [0023] to [0069] JP-A-2010-79239, the content of which is incorporated into this specification.

The film forming by solution casting may be implemented following the conventional method using the conventional apparatus. More specifically, a dope (cellulose acylate solution) prepared in a dissolver (dissolving tank) is filtered, and stored once in a storage tank so as to defoam the dope to remove bubbles entrained therein, to prepare a final product. The dope is kept at 30° C., fed out from a dope discharge port to a pressurized die, typically through a pressurized quantitative gear pump which is capable of precisely feeding liquid based on rotating speed, and is uniformly cast from a nozzle (slit) of the pressurized die onto a metal support which endlessly travels in a casting zone (casting step). Next, at a release point where the metal support almost finishes one turn, a half-dried film of dope (also referred to as "web") is separated from the metal support, then transferred to a drying zone, and dried up while being conveyed through a roller group. The casting step and the drying step in the film forming by solution casting are also detailed in JP-A-2005-104148 on pages 120 to 146, the content of which is applicable to this invention.

The cellulose acylate film used in this invention can be manufactured alternatively by film forming by melt casting, without using the cellulose acylate solution. The film forming by melt casting is a method by which a polymer in a molten state under heating is cast over a support, and then cooled to form a film. The film forming by melt casting is feasible, if the melting point of the polymer, or the melting point of a mixture of the polymer and various additives, is lower than the decomposition temperature(s) of the component(s), and higher than the stretching temperature. The film forming by melt casting is described, for example, in JP-A-2000-352620. The obtained web or film is then wet-stretched and/or dry-stretched by the methods below.

A metal support used in the casting step may be a drum (metal drum) or a band (metal band). The casting speed is preferably 50 m/min to 200 m/min. The surface temperature of the metal support is preferably −30 to 10° C., more preferably −20 to 7° C., and even more preferably −15 to 5° C. The solvent composing the dope preferably contains 1 to 15% by mass of a solvent whose boiling point is 95° C. or higher. The amount of residual solvent in the web, calculated using the equation below, when the web is separated from the metal support, is preferably 101 to 400% by mass, more preferably 120 to 300% by mass, and even more preferably 150 to 300% by mass.

Amount of residual solvent (% by mass)=$\{(M-N)/N\} \times 100$

[In the formula, M represents the mass of cellulose acylate film immediately before entering the stretching zone, and N represents the mass of cellulose acylate film immediately before entering the stretching zone, dried at 110° C. for 3 hours.]

<<Stretching>>

The cellulose acylate film obtained as described above may be stretched, in order to control the mechanical properties or optical properties. The direction of stretching may be any of longitudinal stretching (stretching in the direction substantially in the feed direction), transverse stretching (stretching substantially in the direction normal to the feed direction), oblique stretching, and combination of these stretching schemes. While a preferable range of the stretch ratio may vary depending on target physical values, the cellulose acylate web or film may be stretched by 0.01 to 300%, preferably by 1 to 200%, more preferably by 10 to 100%, and most preferably by 20 to 90%.

The stretching of the cellulose acylate film may be referred to the description in paragraphs [0074] to [0081] of JP-A-2010-79239.

<<Step of Coating Composition Containing Compound Represented by Formula 1, Compound Represented by Formula 2, and Optional Monomer>>

The film of this invention may be manufactured by coating, on one surface of the cellulose acylate film, a composition which contains the compound represented by Formula 1 and the compound represented by Formula 2 (preferably, a composition which contains the compound represented by Formula 1, the compound represented by Formula 2, and the monomer described above in this specification).

Applicable methods of coating the composition include spin coating, dip coating, air knife coating, curtain coating, roller coating, wire bar coating, gravure coating, slide coating, spray coating and die coating.

The amount of coating of the composition is preferably 0.1 to 100 mL/m$^2$, more preferably 1 to 30 mL/m$^2$.

<<Drying Step>>

The cellulose acylate film coated with the composition is then preferably transferred to the drying zone, and dried while being conveyed through a roller group, or while being clipped by a tenter. Applicable methods of drying include a method of blowing a hot air, a warm air or an air with a low gas concentration, a method of irradiating heat rays, and a method of bringing the film into contact with a heated roll. Among them, the method of blowing a hot air, a warm air or an air with a low gas concentration is preferable. The temperature of the air for drying is preferably, but not specifically limited to, −10 to 140° C., more preferably 25 to 120° C., even more preferably 30 to 100° C., and most preferably 40 to 80° C. The drying may proceed at a sufficient drying speed if the drying temperature is set to −10° C. or higher, and the adhesiveness may effectively be improved if the drying temperature is set to 140° C. or lower.

<<Exposure Step>>

For the case where the composition which contains the compound represented by Formula 1, the compound represented by Formula 2 and the monomer is coated over the cellulose acylate film, the dried film is preferably exposed to light. By the light exposure, the monomer can be polymerized.

In the exposure step, the light exposure is preferably given by photo-irradiation. The dose of light exposure is preferably 200 to 800 mJ/cm$^2$, and more preferably 300 to 700 mJ/cm$^2$. Preferable temperature in the exposure step is same as that in the drying step described above.

<<Surface Treatment>>

The cellulose acylate film of this invention may be suitably treated on its surface, so that the adhesiveness with various functional layers (for example, undercoat layer, backcoat layer and optically anisotropic layer) can be improved. The surface treatment may be given typically by saponification (acid saponification, alkali saponification).

<Retardation Film>

The film of this invention may also be used as a retardation film. The retardation film means a film having birefringence over the entire portion or in a partial portion. The retardation film is used in liquid crystal display devices for the purpose of enhancing the contrast of displayed images, or improving viewing angle characteristics or hue. By using the film of this invention, a retardation film capable of ensuring a good durability of a polarizer, as well as compensating the display characteristics, can be manufactured. Also, a plurality of the films of this invention may be laminated, or the film of this invention may be laminated with other film so as to suitably control the retardation, for use as the retardation film. The films may be laminated using a tacky agent or an adhesive. The film of this invention may also be used as a support of the retardation film, on which an optically anisotropic layer containing liquid crystal or the like is formed, for use as the retardation film. The optically anisotropic layer may be formed typically by using a composition which contains a liquid crystalline compound, or may be formed using a birefringent polymer film. The liquid crystalline compound is preferably a discotic liquid crystalline compound or a rod-like liquid crystalline compound. As for the liquid crystalline compound, the description of, for example, paragraphs [0128] to [0131] of JP-A-2010-79239 may be referred to.

<Polarizing Plate>

The polarizing plate of this invention has a polarizer and the film of this invention.

The film of this invention may be used as a protective film of the polarizing plate. The polarizing plate of this invention is composed of a polarizer and two polarizing plate protective films which protect both surfaces thereof, wherein the film of this invention may be used as at least one of the polarizing plate protective films.

The film of this invention, intended to be used as the polarizing plate protective film, is preferably subjected to surface treatment for hydrophilization (also described in JP-A-1106-94915 and ibid. H06-11823) in advance, typically by glow discharge treatment, corona discharge treatment or alkali saponification. The alkali saponification is most preferable as the surface treatment.

As the polarizer, for example, a polyvinyl alcohol film stretched after dipped in an iodine solution may be used. The polyvinyl alcohol film stretched after dipped in an iodine solution is used, in such a way that the treated surface of the film of this invention is directly bonded to one surface or both surfaces of the polarizer using an adhesive. In this invention, it is preferable that the film of this invention is directly bonded to the polarizer as described above. As the adhesive, aqueous solution of polyvinyl alcohol or polyvinyl acetal (for example, polyvinyl butyral), or latex of vinyl polymers (for example, polybutyl acrylate) may be used. A particularly preferable adhesive is an aqueous solution of fully saponified polyvinyl alcohol.

The liquid crystal display device typically has a liquid crystal cell which is disposed between two polarizing plates, and therefore has four polarizing plate protective films. While the film of this invention may be used for any of four polarizing plate protective films, the film of this invention may be used as the protective film which is disposed between the polarizer and the liquid crystal layer (liquid crystal cell) of the liquid crystal display device. On the film disposed, while placing the polarizer in between, on the opposite side of the film of this invention, there may be provided a transparent hard coat layer, anti-glare layer, antireflection layer or the like, and the film of this invention may be used as the polarizing plate protective film on the topmost surface on the viewer's side of the liquid crystal display device.

<Liquid Crystal Display Device>

The film and the polarizing plate of this invention may be used for the liquid crystal display devices operated in various modes.

Various display modes have been proposed, including TN (Twisted Nematic), IPS (In-Plane Switching), FLC (Ferroelectric Liquid Crystal), AFLC (Anti-ferroelectric Liquid Crystal), OCB (Optically Compensatory Bend), STN (Super Twisted Nematic), VA (Vertically Aligned), ECB (Electrically Controlled Birefringence), and HAN (Hybrid Aligned Nematic). Also proposed are display modes using the above-described display modes in multi-domain configuration.

While the film and the polarizing plate of this invention are suitably used in all of these modes, it is preferably used in particular for the VA mode and IPS mode liquid crystal display devices. These liquid crystal display devices may be any of transmission type, half-transmission type and reflection type.

As for the liquid crystal display device, the description of paragraphs [0136] to [0142] of JP-A-2010-79239 may be referred to, the content of which is incorporated into this specification.

EXAMPLE

This invention will be described in further detail, referring to Examples. The materials, amounts of use, ratios, details of processes, procedures of processes and so forth may suitably be modified without departing from the spirit of this invention. The scope of this invention is therefore not limited to the specific examples described below.

[Manufacture of Film]

Example 1

1. Manufacture of Cellulose Acylate Film
(Preparation of Cellulose Acylate Solution)
(1) Cellulose Acylate A cellulose acetate powder having a degree of substitution of 2.86 was used as the cellulose acylate, ("cellulose acylate A" described in paragraph [0157] of JP-A-2010-79239). The cellulose acylate was dried under heating at 120° C. so as to control the moisture content to 0.5% by mass or less, and 20 parts by mass of it was used.

(2) Solvent

Dichloromethane/methanol/butanol=83/15/2 (ratio by mass) was used as the solvent. The moisture content of the solvent at 25° C. was found to be 0.2% by mass or less.

(3) Additives

The additives below were used.
Triphenyl phosphate (1.6 parts by mass)
Biphenyl diphenyl phosphate (0.8 parts by mass)
Compound having the structure below (1.9 parts by mass)

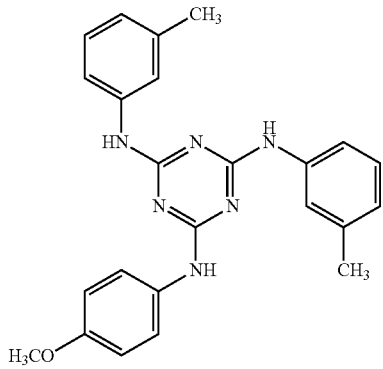 [SMILES: COc1ccc(Nc2nc(Nc3cccc(C)c3)nc(Nc3cccc(C)c3)n2)cc1]

Silicon dioxide particle (particle size=20 nm, Mohs' hardness: about 7) (0.02 parts by mass)

(4) Dissolution

In a 400-liter stainless steel dissolving tank, which is equipped with a stirring blade and configured to allow cooling water to circulate around the outer circumference, the solvent and the additives were placed, and while stirring and dispersing the content, the cellulose acylate was slowly added. After completion of addition, the content was stirred for 2 hours at room temperature, allowed to swell for 3 hours, stirred again, to thereby obtain a cellulose acylate solution.

For the stirring, used were a dissolver-type eccentric stirring shaft which rotates at a circumferential speed of 15 m/sec (shear stress=$5 \times 10^4$ kgf/m/sec$^2$ [$4.9 \times 10^5$ N/m/sec$^2$]), and a stirring shaft having an anchor blade attached to a center shaft which rotates at a circumferential speed of 1 m/sec (shear stress=$1 \times 10^4$ kgf/m/sec$^2$ [$9.8 \times 10^4$ N/m/sec$^2$]). The swelling was allowed to proceed, while keeping the high-speed stirring shaft in the idle state, and keeping the stirring shaft with the anchor blade rotated at a circumferential speed of 0.5 m/sec.

The swelled solution was heated through the tank with a jacketed plumbing up to 50° C., and further up to 90° C. under a pressure of 2 MPa, for complete dissolution. The heating time was 15 min. Now the filter, housing and plumbing, which are exposed to high temperatures, were made of a highly corrosion-resistant hastelloy, jacketed so as to allow a heat medium to circulate therethrough for heat insulation and heating. Next, the content was cooled down to 36° C., to thereby obtain a cellulose acylate solution.

(5) Filtration

The obtained cellulose acylate solution was filtered through a filter paper with an absolute filter rating of 10 μm (#63, from Toyo Roshi Kaisha, Ltd.), and further through a sintered metal filter with an absolute filter rating of 2.5 μm (FH025, from Pall Corporation), to thereby obtain a polymer solution.

(Film Forming)

The polymer solution was heated to 30° C., and then cast through a casting die onto a mirror-finished stainless steel support in the form of a 3-m-diameter drum. The temperature of the support was set to −5° C., the casting speed was set to 100 m/min, and the coating width was set to 200 cm. The spatial temperature of an entire casting zone was set to 15° C. The cellulose acylate film having been rotated after casting was separated from the drum 50 cm before the end point of the casting zone, and then clipped at both edges with a pin tenter. The amount of residual solvent in the web immediately after separated from the drum, calculated using the equation below, was found to be 280% by mass.

Amount of residual solvent (% by mass)=$\{(M-N)/N\} \times 100$

[In the equation, M represents the mass of the cellulose acylate film immediately after passed through the drying zone, and N represents the mass of cellulose acylate film immediately before entering the stretching zone, dried at 110° C. for 3 hours.]

Next, the cellulose acylate film held by the pin tenter was transferred to the drying zone. In the initial drying, a dry air 45° C. was blown. The film was then dried at 110° C. for 5 minutes, further at 140° C. for 10 minutes, to thereby obtain a transparent cellulose acylate film of 90 μm thick. The amount of residual solvent in the thus manufactured cellulose acylate film was found to be 1.0% by mass or less.

(Stretching)

The thus manufactured cellulose acylate film was held at both edges using tenter clips, and stretched in the heating zone in the direction normal to the feed direction, and taken up on a 3900-m roll. The heating zone was set to 180° C. The stretch ratio calculated based on the enlargement/shrinkage rate of the tenter was set to 50%.

The obtained cellulose acylate film was found to have retardation.

2. Coating of Composition

Over the surface the thus stretched cellulose acylate film, having been directed to the air interface side during the film forming (that is, the surface not having been brought into contact with the support for film forming), 14 mL/m$^2$ of a composition was coated, where the composition contains compound A1 shown below (25.9% by mass relative to the total solid content of the composition) as the compound represented by Formula 1, compound B1 shown below (25.9% by mass relative to the total solid content of the composition) as the compound represented by Formula 2, and monomer 1 shown below (34.5% by mass relative to the total solid content of the composition), particle shown below (13.8% by mass relative to the total solid content of the composition), and solvent shown below (92.74% by mass in the composition).

Compound A1

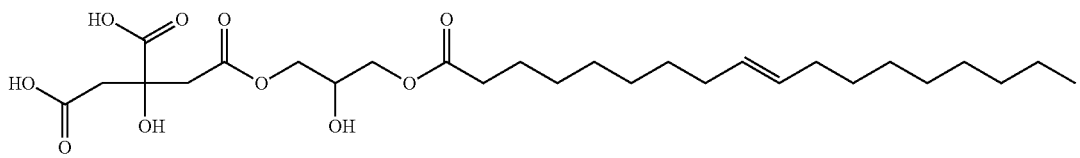

POEM (registered trademark) K-37V (from Riken Vitamin Co., Ltd.)

-continued

Compound B1

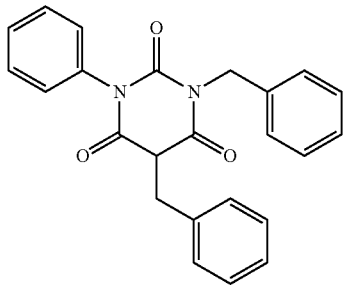

Monomer 1: glycerin monomethacrylate (trade name: Blemmer (registered trademark) GLM, from NOF Corporation), molecular weight=160, SP value difference away from SP value of cellulose acetate=5.0

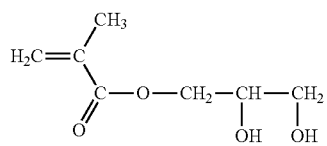

Particle: Silica particle (average primary particle size=1.2 nm, MEK-ST from Nissan Chemical Industries, Ltd.)

Solvent: Methyl acetate:methyl ethyl ketone:propylene glycol 1-monomethyl ether 2-acetate=64:35:1 (ratio by mass)

3. Drying Under Heating and UV Irradiation

The cellulose acylate film coated with the composition was blown with a dry air at 60° C. for 5 minutes, so as to dry the film. Next, the cellulose acylate film was irradiated by 500 mJ/cm² of UV using an air-cooled metal halide lamp (from EYE Graphics Co., Ltd.) at 60° C. in a nitrogen atmosphere, so as to polymerize the monomer. A film of Example 1 was thus obtained.

Example 2

A film was obtained in the same way as in Example 1, except that, in the coating process of the composition, a composition containing no monomer was coated.

Example 3

A film was obtained in the same way as in Example 1, except that, when coating the composition, in place of monomer 1, an equal amount of monomer 2 was used.

Monomer 2: (1,9-nonanediol dimethacrylate) (trade name: Blemmer DMA, from NOF Corporation), molecular weight=226, SP value difference away from SP value of cellulose acetate=3.5

Example 4

A film was obtained in the same way as in Example 1, except that, when coating the composition, in place of compound A1, an equal amount of compound A2 was used.

Compound A2

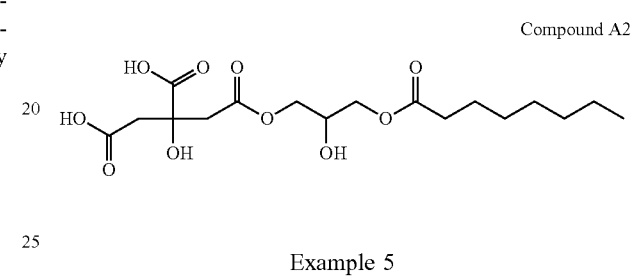

Example 5

A film was obtained in the same way as in Example 1, except that, when coating the composition, in place of compound B1, an equal amount of compound B2 shown below was used.

Compound B2

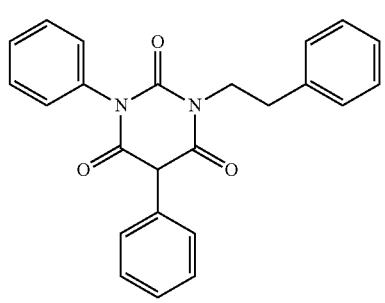

Comparative Example 1

The composition was not coated in the process of Example 1, and the cellulose acylate film after formed and stretched was used as a film of Comparative Example 1.

Comparative Example 2

In the coating process of the composition in Example 1, a composition same as that in Example 1, except that compound B1 is not contained, was used. Except this, a film was obtained in the same way as in Example 1.

Comparative Example 3

In the coating process of the composition in Example 1, a composition same as that in Example 1, except that compound A1 is not contained, was used. Except this, a film was obtained in the same way as in Example 1.

Comparative Example 4

The cellulose acylate solution was prepared in the same way as in Example 1, except that, as the additives used for preparing the cellulose acylate solution in Example 1, and in addition to such additives described in Example 1, compound A1 and compound B1 (0.24 g/m² each of compounds A1 and B1) were added, whose amounts of addition per 1 m² were same as those in the coated layer in Example 1. The film was formed and stretched in the same way as in Example 1. The cellulose acylate film after formed and stretched was used as a film of Comparative Example 4.

Example 6

In the coating process of the composition in Example 1, a composition same as that in Example 1, except that in place of monomer 1 an equal amount of monomer 3 is contained, was used. Except this, a film of Example 6 was obtained in the same way as in Example 1.
Monomer 3: (Trade name: UA306H, from Kyoeisha Chemical Co., Ltd.), molecular weight=765, SP value difference away from SP value of cellulose acetate=0.1

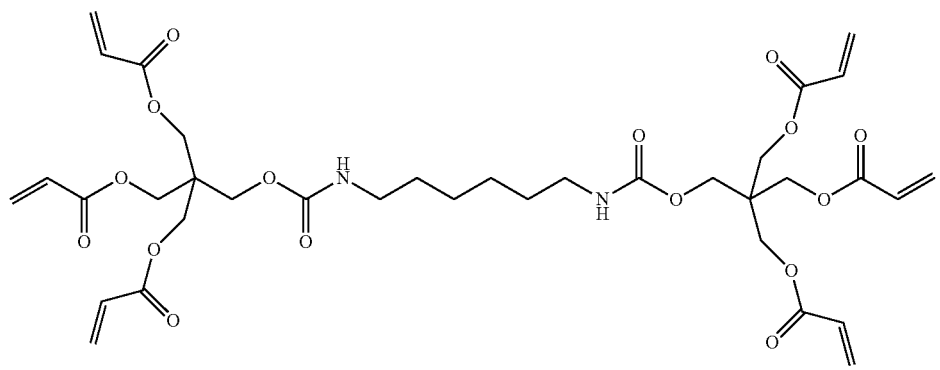 [SMILES: C=CC(=O)OCC(COC(=O)C=C)(COC(=O)C=C)COC(=O)NCCCCCCNC(=O)OCC(COC(=O)C=C)(COC(=O)C=C)COC(=O)C=C]

[Evaluation of Film]

The individual films obtained in Examples and Comparative Examples were evaluated as follows.

<Distribution of Compound Represented by Formula 1 and Compound Represented by Formula 2>

The films manufactured in Examples 1 to 6 and Comparative Examples 2 to 4 were measured to determine the content of the compound represented by Formula 1 and the content of the compound represented by Formula 2 in the zone ranging from one surface of the film (the surface over which the composition was coated, for all films except Comparative Example 4) to a depth of 10%; and the content of the compound represented by Formula 1 and the content of the compound represented by Formula 2 in the residual zone.

The contents were measured by TOF-SIMS (time-of-flight secondary ion mass spectrometry).

Now "condition A" is defined to represent that the content of the compound represented by Formula 1 is larger in the zone ranging from one surface of the film to a depth of 10%, than in the residual zone, and that the content of the compound represented by Formula 2 is also larger in the zone ranging from the one surface of the film to a depth of 10%, than in the residual zone film. Whether the condition A is satisfied or not was determined as described above. Results are shown in Table below.

<Bleeding (Elution) During Saponification>

Each of the films manufactured in Examples 1 to 6 and Comparative Examples 2 to 4 was dipped in a 2.3 mol/L aqueous sodium hydroxide solution at 55° C. for 3 minutes. The film was washed in a washing water bath at room temperature, and neutralized using a 0.05 mol/L sulfuric acid at 30° C. The film was again washed in the washing water bath at room temperature, and further dried with a hot air at 100° C. Each film was thus saponified on the surfaces thereof. Each film thus saponified was placed on black paper, reflected light was made incident thereon, and the film was visually observed to evaluate whether or not the surface thereof is whitened or not. Evaluation criteria are given below. Results of evaluation are summarized in Table below.
A: No visible bleeding on film surface.
B: Visible bleeding on film surface.

<Increase in Film Thickness>

Each of the films manufactured in Examples 1 to 6 and Comparative Examples 1 to 4 was photographed in the thicknesswise direction of the film under a scanning electron microscope, before the composition was coated thereon and after the composition was coated thereon, and change in the thickness was calculated. The change in the thickness in Comparative Example 4 was determined by the difference from the thickness in Comparative Example 1. Evaluation criteria are given below. Results of evaluation are summarized in Table below.
A: No increase in film thickness from pre-coating thickness, or 39% or less increase from that of film laminated with the material without impregnation.
B: 40% or more and 99% or less increase in film thickness from that of film laminated with the material without impregnation.
C: Increase in film thickness same as that of film laminated with the material without impregnation.

[Manufacture of Polarizing Plate]

Each of the films manufactured in Examples and Comparative Examples was dipped in a 2.3 mol/L aqueous sodium hydroxide solution at 55° C. for 3 minutes. The film was washed in a washing water bath at room temperature, and neutralized using a 0.05 mol/L sulfuric acid at 30° C. The film was again washed in the washing water bath at room temperature, and further dried with a hot air at 100° C. Each film was thus saponified on the surface thereof.

A polarizer was manufactured by allowing a stretched polyvinyl alcohol film to adsorb iodine.

Each of the saponified films of Examples and Comparative Examples described above was bonded to one side of the polarizer using a polyvinyl alcohol-based adhesive. Also a commercially available cellulose triacetate film (Fujitac (registered trademark) TD80UF, from FUJIFILM Corporation) was saponified in the same way. The commercially available cellulose triacetate film thus saponified was bonded, using a polyvinyl alcohol-based adhesive, to the polarizer on the surface thereof opposite to the surface having each film of Examples and Comparative Examples already bonded thereto. In this process, the transmission axis of the polarizer was arranged parallel to the slow axis of each film manufactured in Examples and Comparative Examples. The transmission axis of the polarizer was arranged orthogonal to the slow axis of the commercially available cellulose triacetate film thus saponified.

Polarizing plates of Examples 1 to 6 and Comparative Examples 1 to 4 were respectively manufactured in this way.

(Evaluation of Durability of Polarizer)

Durability test for polarizer was conducted in such a way that the polarizing plate was bonded to a glass plate using a tacky agent.

Two samples (approx. 5 cm×5 cm), each composed of the glass plate and the polarizing plate bonded thereto, were manufactured. In the measurement of single-plate cross transmittance, each sample was set so as to face the film side thereof to a light source. Two samples were independently measured, and the average value was determined as the cross transmittance of the polarizing plate. The cross transmittance of the polarizing plate was measured using an automatic polarizing film analyzer VAP-7070 from JASCO Corporation in the range from 380 nm to 780 nm, and measurement values obtained at 410 nm were used. Each sample was then stored at 85° C., 85% relative humidity for 24 hours, then stored at 25° C., 60% relative humidity for 6 hours, and measured in the same way to determine the cross transmittance. Change in the cross transmittance between before and after the elapse of time was determined, and the value was defined to represent the durability of polarizer, and evaluated according to the criteria below. The relative humidity under an environment without moisture conditioning was found to fall within the range from 0 to 20%. Results of evaluation are summarized in Table below.

A: Change of cross transmittance between before and after elapse of time is less than 0.2%.
B: Change of cross transmittance between before and after elapse of time is 0.2% or more, and 0.3% or less.
C: Change of cross transmittance between before and after elapse of time exceeds 0.3%, and 0.35% or less.
D: Change of cross transmittance between before and after elapse of time exceeds 0.35%.

TABLE 1

| | Coating composition | | | |
|---|---|---|---|---|
| | Compound represented by Formula 1 | Compound represented by Formula 2 | Monomer | Condition A |
| Example 1 | Compound A1 | Compound B1 | Monomer 1 | Satisfied |
| Example 2 | Compound A1 | Compound B1 | — | Satisfied |
| Example 3 | Compound A1 | Compound B1 | Monomer 2 | Satisfied |
| Example 4 | Compound A2 | Compound B1 | Monomer 1 | Satisfied |
| Example 5 | Compound A1 | Compound B2 | Monomer 1 | Satisfied |
| Comparative Example 1 | — | — | — | — |
| Comparative Example 2 | Compound A1 | — | Monomer 1 | Not satisfied |
| Comparative Example 3 | — | Compound B1 | Monomer 1 | Not satisfied |
| Comparative Example 4 | — | — | — | Not satisfied |
| Example 6 | Compound A1 | Compound B1 | Monomer 3 | Satisfied |

TABLE 2

| | Evaluation | | |
|---|---|---|---|
| | Durability of polarizer | Bleeding in saponification (Elution) | Increase in film thickness |
| Example 1 | A | A | A |
| Example 2 | A | B | A |
| Example 3 | A | A | A |
| Example 4 | A | A | A |
| Example 5 | A | A | A |
| Comparative Example 1 | D | — | — |
| Comparative Example 2 | C | B | B |
| Comparative Example 3 | C | B | B |
| Comparative Example 4 | C | A | A |
| Example 6 | B | A | C |

(Summary of Examples)

All of the films of Examples 1 to 6, in which the contents of the compound represented by Formula 1 and the compound represented by Formula 2 in the zone ranging from one surface to a depth of 10% are more than the contents in the residual zone, were found to show good durability of the polarizer, and less bleeding during saponification. Examples 1, and 3 to 5, in which monomer having a molecular weight of 500 or less and showing an SP value difference of 2 or more away from the SP value of cellulose acylate was used, were found to show less increase in the film thickness. The films of Comparative Examples 1 to 3, in which at least one of the compound represented by Formula 1 and the compound represented by Formula 2 is not contained, were found to show poor durability of the polarizer. The durability of the polarizer was also found to be poor in the film of Comparative Example 4, in which the compound represented by Formula 1 and the compound represented by Formula 2 are impregnated over the entire portion of the cellulose acylate film.

[Manufacture of Liquid Crystal Display Device]

Polarizing plates, holding in between a liquid crystal cell of a commercially available liquid crystal display television (VA mode 40-inch LCD TV, KDL-40J5000, from SONY Corporation), were peeled off, and each of the polarizing plates of Examples 1 to 6 was re-bonded to the liquid crystal cell. The LCD TV was re-assembled, and observed from oblique directions, proving a good visibility.

The invention claimed is:
1. A film which comprises:
a compound represented by Formula 1 below;
a compound represented by Formula 2 below; and
a cellulose acylate,
wherein a content of the compound represented by Formula 1 below, in a zone ranging from one surface of the film to a depth of 10%, is higher than a content of the compound represented by Formula 1 below in a residual zone, and a content of the compound represented by Formula 2 below, in a zone ranging from the one surface of the film to a depth of 10%, is higher than a content of the compound represented by Formula 2 below in a residual zone;

$$X\text{-}L\text{-}(R^1)_n \qquad \text{Formula 1}$$

in Formula 1, X represents an acidic group having an acid dissociation constant at 25° C. of 5.5 or less; L represents a single bond, or divalent or higher-valent linking group; $R^1$ represents an alkyl group having 6 to 30 carbon atoms, an alkenyl group having 6 to 30 carbon atoms, an alkynyl group having 6 to 30 carbon atoms, an aromatic hydrocarbon group having 6 to 30 carbon atoms or a heterocyclic group having 6 to 30 carbon atoms; n is 1 when L stands for a single bond, and is "valence of L-1" when L stands for a divalent or higher-valent linking group;

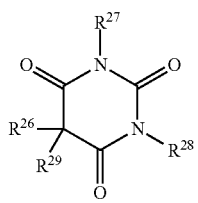

Formula 2 in Formula 2, $R^{26}$ represents an alkyl group, alkynyl group or aromatic hydrocarbon group; each of $R^{27}$ and $R^{28}$ independently represents a hydrogen atom, alkyl group, alkenyl group, aromatic hydrocarbon group or aromatic heterocyclic group; $R^{29}$ represents a hydrogen atom, alkyl group or aromatic hydrocarbon group; and each of $R^{26}$, $R^{27}$, $R^{28}$ and $R^{29}$ may independently have a substituent;

the film further comprises a polymer composed of a monomer having a molecular weight of 500 or less and showing an SP value difference of 2 or more away from the SP value of cellulose acylate, wherein the SP value is a solubility parameter, and is defined as a value calculated based on the Hoy method.

2. The film of claim 1, wherein the compound represented by Formula 1 and the compound represented by Formula 2 are contained in a cellulose acylate film.

3. The film of claim 1, wherein, relative to a total content of the compound represented by Formula 1 contained in the film, a ratio of content of the compound represented by Formula 1 in a zone ranging from one surface of the film to a depth of 10% is 70% by mass or more, and a ratio of content of the compound represented by Formula 1 in a residual zone is 30% by mass or less; and, relative to a total content of the compound represented by Formula 2 contained in the film, a ratio of content of the compound represented by Formula 2 in a zone ranging from the one surface of the film to a depth of 10% is 70% by mass or more, and a ratio of content of the compound represented by Formula 2 in a residual zone is 30% by mass or less.

4. The film of claim 2, wherein, relative to a total content of the compound represented by Formula 1 contained in the film, a ratio of content of the compound represented by Formula 1 in a zone ranging from one surface of the film to a depth of 10% is 70% by mass or more, and a ratio of content of the compound represented by Formula 1 in a residual zone is 30% by mass or less; and, relative to a total content of the compound represented by Formula 2 contained in the film, a ratio of content of the compound represented by Formula 2 in a zone ranging from the one surface of the film to a depth of 10% is 70% by mass or more, and a ratio of content of the compound represented by Formula 2 in a residual zone is 30% by mass or less.

5. The film of claim 1, which has a thickness of 0.1 to 120 μm.

6. The film of claim 1, which is a retardation film.

7. The film of claim 1, which is manufactured by coating a composition on one surface of a cellulose acylate film, the composition containing the compound represented by Formula 1, the compound represented by Formula 2, and the monomer; and allowing the monomer to polymerize.

8. A method of manufacturing the film of claim 1, the method comprising:

coating a composition on one surface of a cellulose acylate film, the composition containing the compound represented by Formula 1, the compound represented by Formula 2, and the monomer; and allowing the coated monomer to polymerize.

9. A polarizing plate which comprises a polarizer and the film of claim 1.

10. A liquid crystal display device which comprises the film of claim 1.

11. A liquid crystal display device which comprises the polarizing plate of claim 9.

12. A composition which comprises:

a compound represented by Formula 1 below;

a compound represented by Formula 2 below; and a monomer having a molecular weight of 500 or less and showing an SP value difference of 2 or more away from the SP value of cellulose acylate;

$$X\text{-}L\text{-}(R^1)_n \qquad \text{Formula 1}$$

in Formula 1, X represents an acidic group having an acid dissociation constant at 25° C. of 5.5 or less; L represents a single bond or divalent or higher-valent linking group; $R^1$ represents an alkyl group having 6 to 30 carbon atoms, an alkenyl group having 6 to 30 carbon atoms, an alkynyl group having 6 to 30 carbon atoms, an aromatic hydrocarbon group having 6 to 30 carbon atoms or a heterocyclic group having 6 to 30 carbon atoms; n is 1 when L stands for a single bond, and is "valence of L-1" when L stands for a divalent or higher-valent linking group;

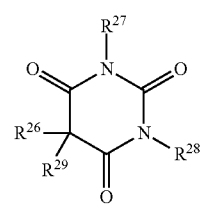

Formula 2 in Formula 2, $R^{26}$ represents an alkyl group, alkynyl group or aromatic hydrocarbon group; each of $R^{27}$ and $R^{28}$ independently represents a hydrogen atom, alkyl group, alkenyl group, aromatic hydrocarbon group or aromatic heterocyclic group; $R^{29}$ represents a hydrogen atom, alkyl group or aromatic hydrocarbon group; and each of R26, $R^{27}$, $R^{28}$ and $R^{29}$ may independently have a substituent;

wherein the SP value is a solubility parameter, and is defined as a value calculated based on the Hoy method.

13. The film of claim 1, wherein the monomer has a molecular weight of 500 or less and showing an SP value difference of 2 or more away from the SP value of cellulose acetate.

14. The film of claim 13, which is manufactured by coating a composition on one surface of a cellulose acylate film, the composition containing the compound represented by Formula 1, the compound represented by Formula 2, and the monomer.

15. A method of manufacturing the film of claim 13, the method comprising:

coating a composition on one surface of a cellulose acylate film, the composition containing the compound represented by Formula 1, the compound represented by Formula 2, and the monomer.

16. The composition of claim 12, wherein the monomer has a molecular weight of 500 or less and showing an SP value difference of 2 or more away from the SP value of cellulose acetate.

\* \* \* \* \*